United States Patent
Roenner et al.

(10) Patent No.: US 11,650,974 B2
(45) Date of Patent: May 16, 2023

(54) CROSS-SYSTEM PROCESS CONTROL FRAMEWORK

(71) Applicant: SAP SE, Walldorf (DE)

(72) Inventors: Jan Roenner, Walldorf (DE); Klaus Meyer, Walldorf (DE); Dietmar Kaiser, Wiesloch (DE); Hristo Matev, Nussloch (DE)

(73) Assignee: SAP SE, Walldorf (DE)

( * ) Notice: Subject to any disclaimer, the term of this patent is extended or adjusted under 35 U.S.C. 154(b) by 259 days.

(21) Appl. No.: 16/918,665

(22) Filed: Jul. 1, 2020

(65) Prior Publication Data

US 2022/0004534 A1   Jan. 6, 2022

(51) Int. Cl.
G06F 16/23        (2019.01)
G06F 9/52         (2006.01)
H04L 67/1095      (2022.01)

(52) U.S. Cl.
CPC ......... *G06F 16/2365* (2019.01); *G06F 9/526* (2013.01); *G06F 16/2379* (2019.01)

(58) Field of Classification Search
CPC .. G06F 16/2365; G06F 9/526; G06F 16/2379; G06F 2209/522; H04L 67/1095
See application file for complete search history.

(56) References Cited

U.S. PATENT DOCUMENTS 6,021,508 A  *  2/2000  Schmuck ............ G06F 16/1858
                                                       714/20
7,266,573 B2     9/2007  Pecht-Seibert
9,009,182 B2     4/2015  Renkes et al.
(Continued)

FOREIGN PATENT DOCUMENTS

EP    0 694 839 A2   1/1996
EP      0694839 A2   1/1996

OTHER PUBLICATIONS

Partial European Search Report for Application No. 21771991.9, dated Nov. 11, 2021.

(Continued)

*Primary Examiner* — Robert W Beausoliel, Jr.
*Assistant Examiner* — Mohammad S Bhuyan
(74) *Attorney, Agent, or Firm* — Klarquist Sparkman, LLP

(57) ABSTRACT

Methods and apparatus are disclosed for controlling distributed software applications implementing asynchronous replication of shared data objects. Each shared data object has a distinct token. A token has respective states (active or inactive) at each computing system sharing the data object. At most one computing system can have the token active at any time; possessing an active token allows a computing system to update the shared data object. Counters maintain state across the computing systems, and semantic checks specific to a class of data objects (or, a single object) ensure consistency of updates across computing systems. Token activation requests and update replication requests are supported. Participating computing systems can have asymmetric or symmetric roles. Token management can be provided by a framework offering superior performance compared to conventional locking systems, co-existence with local conventional locking systems, and a single uniform interface for streamlined integration with existing software applications.

20 Claims, 12 Drawing Sheets

(56) References Cited

U.S. PATENT DOCUMENTS

| | | | |
|---|---|---|---|
| 9,501,502 B2 | 11/2016 | Lee et al. | |
| 9,817,645 B2 | 11/2017 | Nos et al. | |
| 9,990,392 B2 | 6/2018 | Pound et al. | |
| 10,185,737 B2 | 1/2019 | Renkes et al. | |
| 10,474,664 B2 | 11/2019 | Bhargava et al. | |
| 10,503,699 B2 | 12/2019 | Gupta et al. | |
| 2004/0215772 A1* | 10/2004 | Dinker | H04L 67/1097 709/225 |
| 2021/0049614 A1* | 2/2021 | Jurss | G06Q 20/3223 |

OTHER PUBLICATIONS

Gupta, "SAP Central Finance—Cross-System Process Control for Central Payment (CSPC)", available from https://blogs.sap.com/2020/06/05/sap-central-finance-cross-system-process-control-for-central-payment-cspc/, 5 pages (Jun. 5, 2020).

SAP, "Central Finance", available from https://help.sap.com/viewer/26c2d5e366bc44c1a98f2a9212a0c49d/1909.002/en-US/26a1959f31aa4e26981237c3985e0749.html, pp. 1-234 (May 2020).

SAP, "Central Payment—Cross-System Process Control", pp. 1-2, downloaded from https://help.sap.com/doc/474a13c5e9964c849c3a14d6c04339b5/100/en-US/658a52b1e29d420bb6c6cc8224dc514d.html on Jun. 24, 2020.

SAP, "Cross-System Processing", pp. 1-4, downloaded from https://help.sap.com/saphelp_tm90/helpdata/en/4e/d4c1daf18b56a6e10000000a421937/content.htm?no_cache=true on Jun. 24, 2020.

SAP, "Enqueue Server", pp. 1-3, downloaded from https://help.sap.com/doc/saphelp_nw70/7.0.31/en-US/fb/aad1811dd446659df0380264089b24/content.htm?loaded from frameset=true on Jun. 24, 2020.

SAP, "Relationship Between SAP Locks and Database Locks", pp. 1-2, downloaded from https://help.sap.com/doc/saphelp_nw70/7.0.31/en-US/f4/71aa036c874c308c1a819f05321137/content.htm?loaded_from_frameset=true on Jun. 24, 2020.

SAP, "SAP Lock Concept", downloaded from https://help.sap.com/doc/saphelp_nw70/7.0.31/en-US/7b/f9813712f7434be10000009b38f8cf/frameset.htm on Jun. 24, 2020.

Extended European Search Report, Application No. 21171991.9-1213/3933588, dated Mar. 16, 2022, 24 pages.

Tanenbaum et al., "Distributed Systems: Principles and Paradigms 2nd Edition", In Distribution Systems Paradigms (2nd Edition), Oct. 12, 2006, pages ToC, Ch 01-02, Ch 07-09, Ch 11, sections 1.2, 2.2, 7, 11.5, 11.6.

* cited by examiner

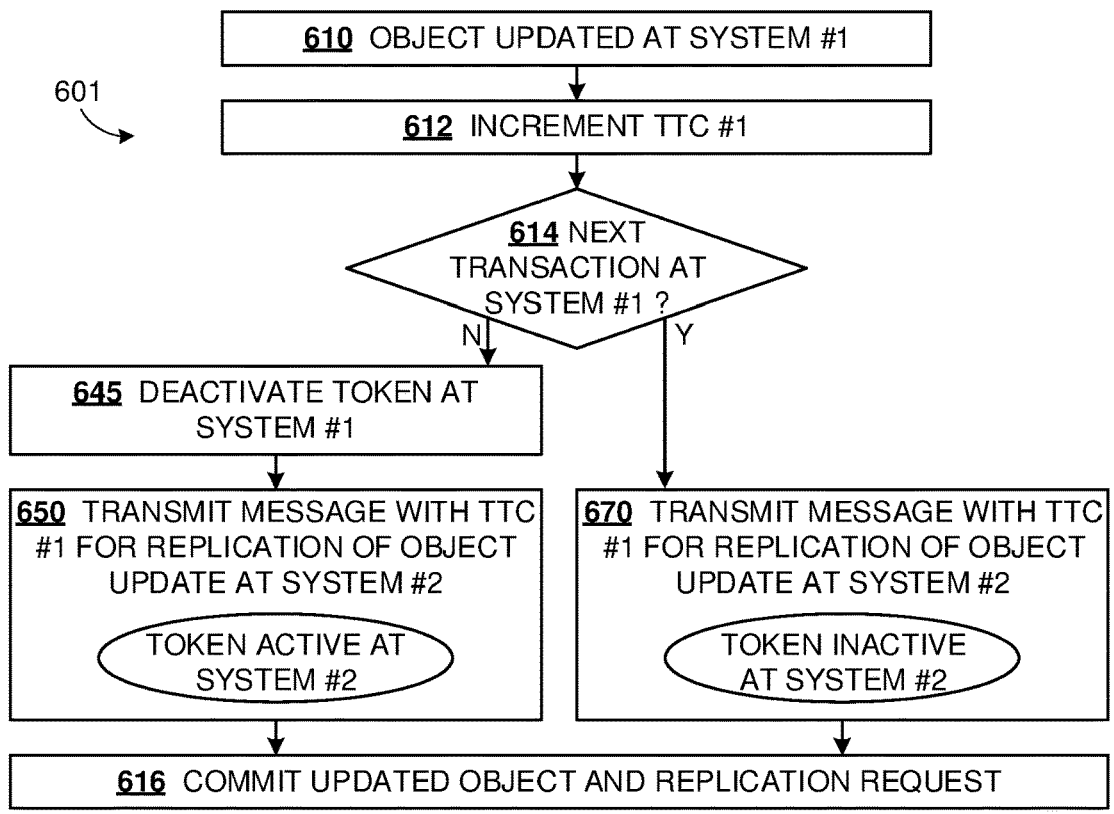
FIG. 6A
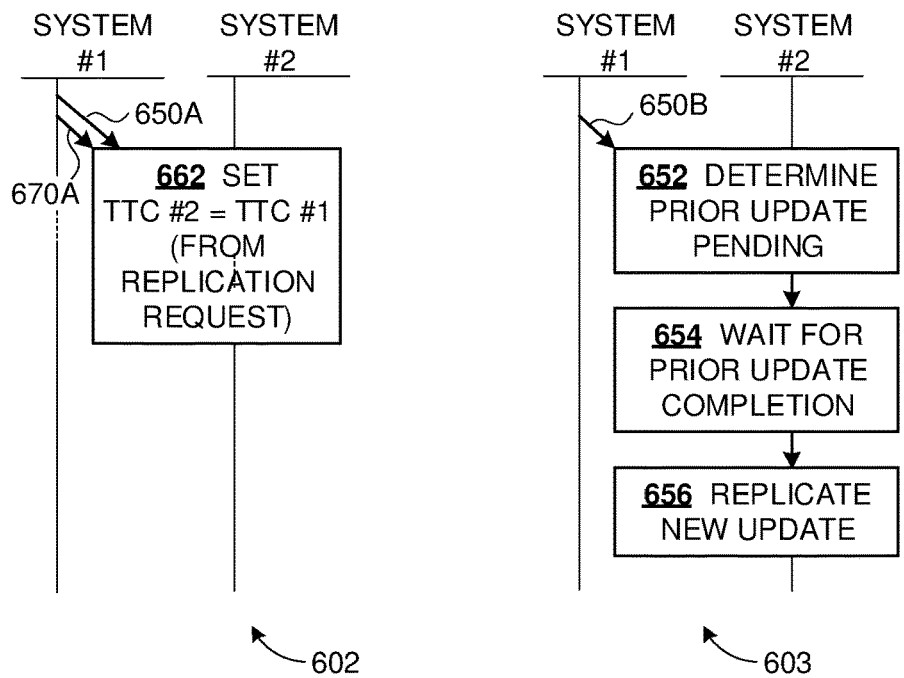
FIG. 6B　　　FIG. 6C

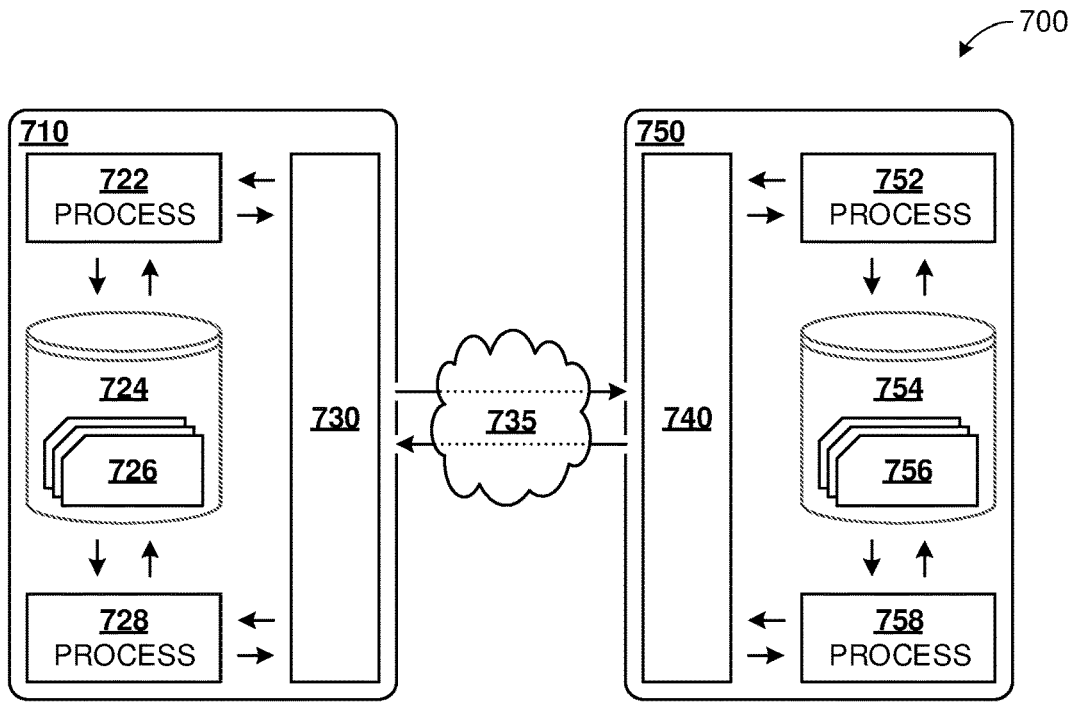
FIG. 7
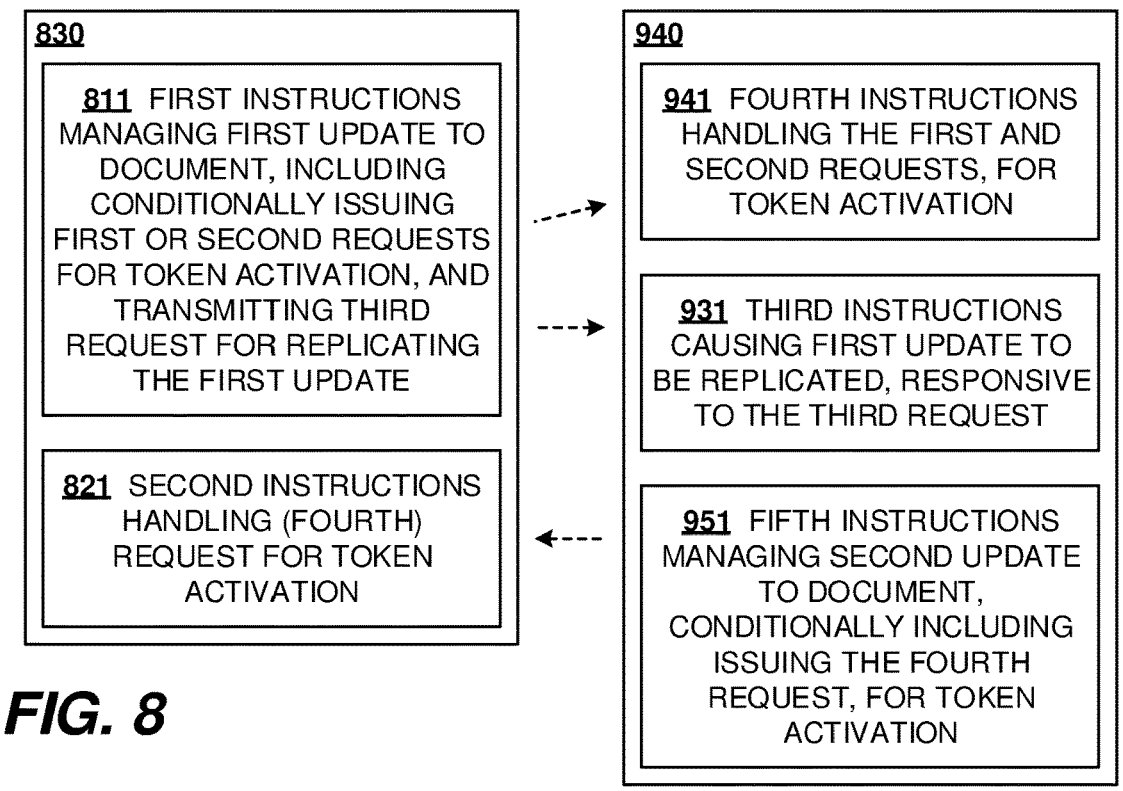
FIG. 8
FIG. 9

CROSS-SYSTEM PROCESS CONTROL FRAMEWORK

BACKGROUND

Consistency of data operations among software processes is a fundamental requirement of distributed software applications. Locks can be used to provide mutual exclusion between processes, so that only one process at a time has write access to the shared data object. However, conventional lock technology is suitable for synchronous processes running on a single computing system with a single instance of the shared data, and can have high overhead. As software applications evolve to distributed deployments over computing systems that can be hundreds or thousands of miles from each other, that can have distinct copies or versions of shared data objects, or that can replicate updates asynchronously, constraints on consistency requirements can change. Conventional lock techniques, designed for tightly-coupled synchronous processes, can suffer significant performance degradations due to extended lock periods in a distributed asynchronous environment, and can also suffer reduced efficiency from increased load on a lock server itself. Accordingly, there remains a need for improved technologies to efficiently guarantee consistency for operations on shared data in a distributed environment.

SUMMARY

In summary, the detailed description is directed to various innovative technologies for control of software processes across computer systems. Examples of disclosed technologies use a token framework to ensure consistency among updates to copies or versions of shared data objects across two or more computer systems. A computer with an active token for a given data object can update the data object, while the token is inactive for other computers. A computer can request the active token, or can issue a request for replication of a locally completed update. Replication can be performed asynchronously. Semantic checks can ensure appropriate behavior based on logic specific to the data object, to a class of data objects, or to a software process.

In certain examples, the disclosed technologies can be implemented as a computer-implemented method of updating a data object. At a first computing system, a determination is made that a token for the data object is in an inactive state, and a request is issued for activation of the token at the first computing system. At a second computing system, which has the token in an active state, the request is handled by verifying that a semantic check for the data object is satisfied, and then releasing the token to the first computing system. Responsive to the releasing, the data object is updated at the first computing system.

In some examples, a message can be transmitted, from the first computing system to the second computing system, to replicate the updating at the second computing system. The method can further include making a determination that the active state token can be released, after the updating, from the first computing system. Accordingly, the message can designate the token as active at the second computing system. In other examples, the semantic check can determine whether a state of the data object at the second computing system is consistent with the updating of the data object at the first computing system.

In additional examples, the token can be protected with a lock, locally at the first computing system, for the determining action. The data object can be protected with a lock locally at the first computing system for the updating action. One or more data objects required for the semantic check can be protected with respective lock(s), at the second computer system, for the verifying action. The one or more objects can include a copy of the data object stored at the second computing system, or at least one additional data object.

In another example, the request can be a first request and the updating can be a first updating for a first transaction on the data object. The method further comprises, for a second transaction comprising a second update to the data object. With the token in the inactive state at the first computing system, a second request can be issued for the token to be activated for the first computing system. With the token in the inactive state at the second computing system, and no pending updates associated with the token, a response to the second request can be transmitted, the token can be updated at the first computing system, and the second update to the data object can be performed.

In yet another example, the request can be a first request and the updating can be a first updating for a first transaction on the data object. The method can extend to a second transaction comprising a second update to the data object. With the token in the inactive state at the second computing system, a second request can be issued for the token to be activated for the second computing system. At the first computing system, a second determination can be made that a prior replication request on the data object is pending, and a message can be transmitted from the first computing system to the second computing system to deny the second request. The second determination and the transmitting are performed with the token in the inactive state at the first computing system. The second determination can be based on a comparison of a first transfer counter for the token at the first computing system and a second transfer counter for the token at the second computing system. The second transfer counter can be included with the second request.

In a further example, the request can be a first request and the updating can be a first updating for a first transaction on the data object. The method can extend to a second transaction comprising a second update to the data object. With the token in the active state at the first computing system, the second update can be aborted, and the token can be released, leaving the token in an inactive state at both the first and second computing systems. Both the first and second computing systems can be enabled to subsequently issue a second request for activation of the token.

In a still further example, the request can be a first request and the updating can be a first updating for a first transaction on the data object. The method can extend to a second transaction comprising a second update to the data object. With the token in the inactive state at the first computing system, a second request can be issued for the token to be activated for the first computing system. With the token in the active state at the second computing system, a determination can be made that the semantic check for the data object is not satisfied. Accordingly, a message can be transmitted, to the first computing system, denying the second request.

In certain examples, the disclosed technologies can be implemented as computer-readable media storing instructions which, when executed by one or more hardware processors, cause the hardware processors to perform the following actions. Responsive to an update of an object at a first computing node, a message is transmitted to a second computing node for replication of the update. The message designates a state of a token associated with the object. In a first case, the message designates the token as active at the second computing node, and in a second case, the message designates the token as inactive at the second computing node.

In some examples, the operations can also include selecting between the first case and the second case based upon an indication whether a next update on the object is more likely to be at the first computing node or at the second computing node. The first and second computing nodes can maintain respective first and second token transfer counts for the token. The operations can also include incrementing the first token transfer count upon completion of the update at the first computing node; incorporating the incremented first token transfer count in the message; and, at the second computing node, updating the second token transfer count upon receipt of the message, along with performing the replication of the update.

In an additional example, the update can be a second update following an earlier first update to the object. The operations can further include detecting, at the second computing node, that the first update on the object is pending, waiting until the first update has been completed, and then performing the replication of the second update. In a further example, the update can be a first update, the message can be a first message that designates the token as inactive at the second computing node. The operations can include transmitting a second message to the second computing node for replication of the second update that is subsequent to the first update. The second message can designate the token to be active at the second computing node.

In certain examples, the disclosed technologies can be implemented as a system of one or more hardware processors with memory coupled thereto, a network interface coupling the hardware processor(s) to a satellite computing node, and non-transitory computer-readable media storing at least the following computer-executable instructions. First instructions, when executed, manage an update to a document protected by a token framework, by performing the following operations. A first token state is checked for an originating computing node. In a first case having the first token state being inactive, a first request is issued to activate the token. Upon approval of the first request, the token is activated. In a second case having the first token state being missing, a second request is issued to activate the token. Upon approval of the second request, the token is created in an active state. The update to the document is caused to occur at the originating computing node. A transfer counter of the token is incremented. A first semantic check is performed, and a third request to replicate the update at the satellite computing node is transmitting, over the network interface. Second instructions, when executed, handle a fourth request, for token activation, by performing the following operations. A check is performed using one or more parameters of the token for the originating computing node and one or more parameters of the token for the satellite computing node. A second semantic check is performed. A determination is made whether to deny or approve the fourth request. In a third case, the token is deactivated for the originating computing node, and a response to the fourth request, indicating that the fourth request is approved, is transmitted over the network interface. In a fourth case, a response to the fourth request, indicating that the fourth request is denied, is transmitted over the network interface.

In some examples, the one or more hardware processors are part of the originating computing node, the update is a first update, and the system further includes at least one additional hardware processor of the satellite computing node, with additional memory coupled thereto and an additional network interface coupled to the originating computing node. Additional computer-readable media can store additional instructions executable by the additional hardware processor(s). Third instructions, when executed, can cause the first update to be replicated at the satellite computing node responsive to the third request. Fourth instructions, when executed, can handle the first or second request. Fifth instructions, when executed, can manage a second update to the document including, in a fifth case, issuing the fourth request. In further examples, the computer-readable media at the originating computing node can include copies of the third, fourth, and fifth instructions, and the additional computer-readable media at the satellite computing node can include copies of the first and second instructions.

The foregoing and other objects, features, and advantages of the invention will become more apparent from the following detailed description, which proceeds with reference to the accompanying figures.

BRIEF DESCRIPTION OF THE DRAWINGS

FIGS. 6A-6C are parts of a flowchart of a second example method for replicating an update to a data object according to the disclosed technologies.

FIG. 7 is a block diagram of a first system architecture implementing an example of the disclosed technologies.

FIG. 8 is a diagram of first example software for a token layer according to the disclosed technologies.

FIG. 9 is a diagram of second example software for a token layer according to the disclosed technologies.

DETAILED DESCRIPTION

Introduction

Figure 1:
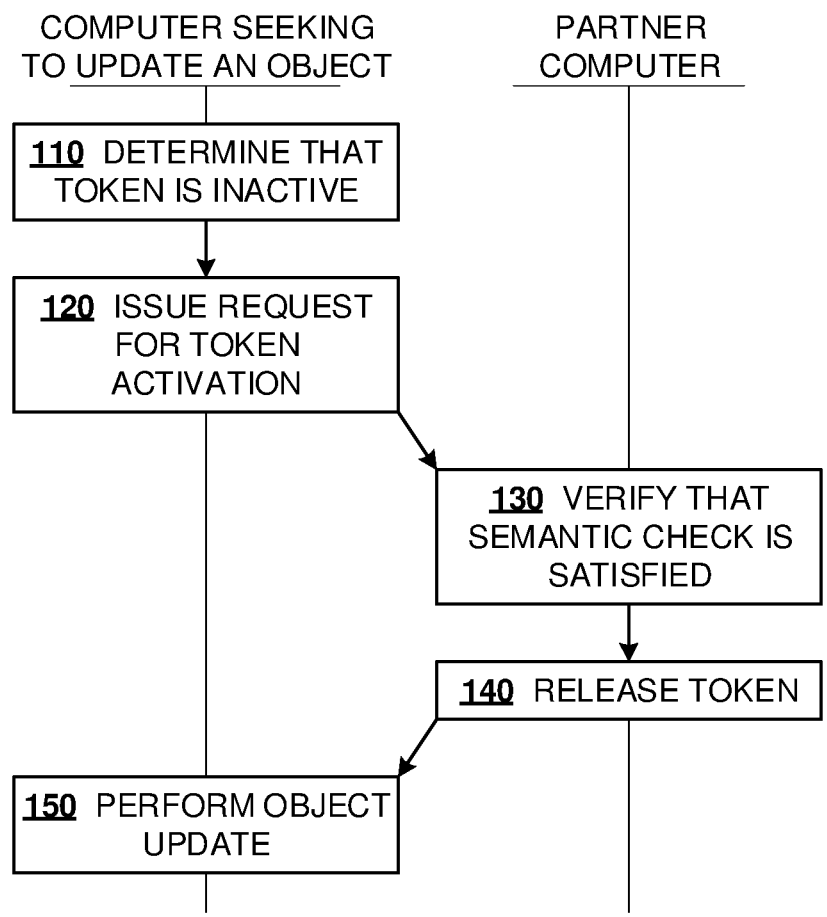
FIG. 1 is a flowchart of a first example method for updating a data object according to the disclosed technologies.

The disclosed cross-system process control (CSPC) technologies provide a fresh, innovative approach to maintaining consistent data state for distributed software processes that implement asynchronous replication of shared data objects. Data objects at any scale can be protected using tokens. Each data object to be protected can have a distinct token, and each computer system (or, software process) sharing the data object can have its own state for the token, along with counters or other optional variables. A computer system can update the protected data object when it has the token in an active state. Only one computer system can have the token active at any given time. In this way, only one computer system at a time can update the object, and conflicts can be avoided.

However, the disclosed token management differs from a conventional lock in that the token can be released by a first computer after its update is complete locally, without waiting for asynchronous replication at a second computer. In a conventional lock system, the lock would not be released until the replication at the second computer is complete. The difference in time scales can be multiple orders of magnitude—to illustrate, a local update could take around 10 ms, while replication could take around 10 s. A lock lasting 10 s uses 1,000 times as much of the lock server resource as a lock lasting 10 ms. Thus, the disclosed approach greatly reduces the burden that would be experienced supporting a distributed software application using a conventional locking system. Additionally, because the lock itself can be active for only a short period of time (e.g. on the order of milliseconds), the burden on the software application can also be greatly reduced, even though a partner computer can take a long time to complete replication. In part, these advantages accrue through the use of counters to verify correct, consistent logic at two or more computers sharing a given data object, as described further herein.

Some advantages can be demonstrated through a simple example. Consider a software application making 100 independent updates to a data object, each of which must be replicated to a remote computer. With a conventional locking approach, each update would take 10 seconds mostly waiting for replication to complete at the remote computer, without which the software application is blocked from proceeding to the next update. Thus, the total time required would be about 100×10 s=1,000 seconds. In contrast, with the disclosed token management, each update can take 10 ms to perform the update locally and issue a replication request. Because the replication request can be issued without releasing the token, the software application can continue to make all 100 updates while retaining the active token, for a total of 100×10 ms=1 second. Adding at most 10 seconds waiting for replications to commence, and another second for all 100 replications to be completed at the remote computer, the total elapsed time is only 1+10+1=12 seconds, for a saving of over 98%.

The disclosed token framework can be customized for efficiency according to specific needs of a software application. In some instances, it can be desirable to maintain identical copies of shared data objects across participating computers, however this is not always required. In some instances, a central computer can be supported by satellite computers in one or more remote locations. In some instances, the central computer can require all updates from the satellite computers, however some or all updates originating at the central computer may not be required at the satellite computers. As one example, a satellite computer can provide invoices to a central finance computer. Occasionally, the satellite computer may seek to reverse an invoice. Knowledge of both new invoices and occasional reversals can be required at the central finance computer, and accordingly such updates can be replicated from the satellite computer to the central finance computer. The central computer can handle payment of invoices from one or more satellite computers, and the satellite computers may not need to be informed of the payment, and accordingly notification or replication of payment events can be omitted at the satellite computer. As another example, a central traffic control computer of a transit system can be coupled to satellite computers at individual stations and on individual trains. Events at the stations and trains (e.g. actual arrivals, passenger volumes) can be updated, as they occur, to a shared database of operational data, and replicated to the central traffic control computer. Some central computer operations, such as updates to a train schedule can be replicated to the associated trains and stations, while other operations, such as generating reports for central planning, in the same database of operational data, need not be replicated to the trains or stations. Thus, shared data objects can provide both two-way and one-way flow of information between distributed parts of a software application. The disclosed token framework can support both paradigms, so that data updates are replicated as required for consistency, and unneeded replications can be omitted.

Additionally, the disclosed technologies can be provided as a framework with a uniform interface, for streamlined migration of an existing codebase. This can facilitate integration of token management into an existing software application, which can be a significant practical consideration. Particularly, the need to separately address each instance of a shared data object in a code base can be completely eliminated.

Terminology

The usage and meaning of all quoted terms in this section applies throughout this disclosure unless clearly indicated otherwise or repugnant to the context. The terminology below extends to related word forms.

"Abort" refers to an operation of terminating a transaction such as an update to a data object. The transaction can be aborted prior to execution, during execution, or after execution but before commit of the transaction.

An "application" or "software application" is a computer-executable program performing functions for one or more clients, and can be distinct from an operating system, a software library, a test suite, or a development environment. Additionally, some applications can operate without clients, e.g. launched by a supervisor or another application, performing tasks autonomously or in an event-driven mode. An application can include both executable instructions (dubbed "code" or "program code") and non-executable data (dubbed "application data" or "program data"). A software application can include one or more software processes and can be executed on a single computer or distributed over multiple computing systems. Distributed software application to which the disclosed technologies can be applied include management of communication, sensor, power distribution, or transportation networks; decentralized business operations; or grid computing;

As a verb, the term "block" refers to a software process waiting for an event to occur. In some disclosed examples, a software process that issues a request can block until a response to the request is received. In other examples, a software process detecting a condition can block until the condition is cleared. For example, a software process detecting a pending update can block until the update is complete. As another example, a software process detecting a failed semantic check can block until the semantic check passes. However, blocking is not a requirement, and a token function can be implemented as non-blocking in some common embodiments. Thus, a request for a token service can be denied immediately based on a failed semantic check or existing condition, and the request can be attempted again at a later time by which time the semantic check or the condition may have cleared.

"Call" refers to invocation of a function, such as a call from a software application to a function of a software library, or a call from a framework to a function of a software application.

A "client" is a hardware or software computing entity that uses a resource provided by another hardware or software computing entity dubbed a "server."

Multiple computing systems sharing a data object, a software application, or a token framework can collectively be dubbed "participating computers" or "partners." Participating computers can have different roles in the described methods. From the perspective of a token activation request or a replication request, the source of the request can variously be termed "sender," "originator," or "source," and the recipient can be termed a "receiver," "satellite," or partner. For some data objects, roles can be exchanged, while for other data objects roles can be static. Further, the terms "computer," "computing system," "computing node," (or simply "system" or "node") are used interchangeably herein.

"Consistency" is a property of a shared data object at a given computer that has correct information for software processes at the given computer to function correctly. Because two software processes at different computers can have different roles, in some examples the correct information required at each computer can differ, and consistent copies of a given shared data object need not be identical. In other examples, shared copies of a data object can eventually become identical, which is dubbed "coherence" of the data object. Due to pending updates, a shared data object can be in an inconsistent state. The disclosed token framework can block software processes from using such inconsistent data.

A "copy" or "version" of a data object is one of multiple instances of the data object at respective computing systems. Although in some examples two copies of a data object can be identical this is not a requirement. Due to time lags involved with asynchronous replication, a first copy of the data object can include updates not yet performed on a second copy of the data object. Further, because software application can have asymmetric roles for participating computers, an update performed on one computer can in some instances be omitted at the other computer. This is akin to lazy replication of an update, where a replication can be made only when needed at the other computer: if the replication is not needed at the other computer, then the replication can be omitted. In some examples, one copy of the shared data copy can be designated a master, and other copies can be satellite or slave copies.

A "data object" is a software entity that occupies some memory or storage space at runtime, in which one or more items of data are stored, and that is directly or indirectly accessible by a software application. Some data objects of interest in this disclosure can be updated by one or more software processes, or can have replicated copies stored in respective computing environments. Some data objects of interest in this disclosure can be records or tables of a database, or documents of a domain associated with a software application. For example, in a wireless communication system, documents can include network logs, trouble reports, regulatory compliance data, or performance monitoring records related to a service level agreement (SLA). In a business environment, documents can be invoices, payment records, orders, inventory records, forecasts, or budgets.

The unqualified term "data" refers to any digital representation of information.

A "database" or "database system" is an organized collection of data maintained on computer-readable media and accessible by execution of instructions at one or more processors. Databases can be relational, in-memory or on disk, hierarchical or non-hierarchical, or any other type of database. A database can store an original or master copy of one or more data items. All or part of a database maintained at an origin or source computing node can be replicated at one or more additional satellite nodes.

A "framework" is a kind of software library which provides a software development or execution environment to which additional custom or application-specific code can be added. Frameworks can be extensible. In some examples, an application built on a framework can have control flow with the framework calling application code, as compared to other architectures in which application code can call library functions. Examples of a disclosed token service layer, in part, can have functions that are called by a local portion of a distributed software process, and can also execute calls (sometimes dubbed "callback") to functions of the software process.

An "application programming interface" (API), or "interface" for short, can define calling syntax for one or more methods of a software library or framework. An API can include calls from an application to a library, or from a framework to an application.

A "layer" refers to one or more software modules in a computing environment that interface between disparate software entities on either side of the layer, and that provide a related set of functions or services. As an example, a layer can provide services to software applications on one side, and on the other side can communicate with a peer layer on another computing system. A layer of interest in this disclosure is a token management layer which provides services, using tokens, to asynchronously maintain consistency of data copies on two distinct computing systems.

A "library" refers to a computer-executable program performing functions for a software application or other software, and can be distinct from a software application, an operating system, or a development environment.

The term "local" refers to a value, a copy of a data object, a function, or other software entity that is present on a same computing system as the local entity is being used or determined.

A "lock" is a mechanism for synchronous access control between two or more software processes or applications. Specifically, a lock can protect against two software processes making conflicting changes to a single data object. A lock can restrict write access to a common shared data object to at most one software process at a time, and the lock is said to be "granted" to that software process. A lock mechanism can be synchronous insofar as a second software process cannot make writes to the data object for the entire duration for which a first software process has the lock. In some examples of the disclosed technologies, locks and tokens can be used together: token-related functions on a given computing system can use local locks to protect accessed data objects for the duration of such functions, e.g. within a transaction, and can result in a change of token state which can persist, e.g. across multiple transactions. The granularity of a lock can be different than the granularity of a token. For example, in invoice transactions, individual tokens can be associated with each invoice, however a lock used for e.g. an invoice payment process can be used at a wider scale such as a vendor, whose multiple invoices can be processed concurrently. Other software actions for the invoice, e.g. reversal of a single invoice, can choose a fine-grained local lock for the single invoice. Thus, a single token framework implementation can co-exist with different lock granularities according to the software process logic.

A "message" is a digital communication from one computing hardware or software entity to another hardware or software entity. A message can be a request, but this is not a requirement.

"Metadata" refers to an attribute of a data object that indicates a property of the data object, but is not stored within the data object.

A "pending" update is an update that is queued or which has been requested (e.g. by a software application or, in case of a replication, by a token management layer) but has not yet been performed. An update at a given computer progresses from pending, to executing, and (after a possible delay) to committing, after which the update is complete. A replication request can be issued for a locally committed update, whereby the replication can go through similar phases at a partner computer. A "pending" request refers to a request that has been issued but not yet responded to.

In the context of requests and corresponding responses, the terms "receive" and "transmit" refer to communication over a network, which can be in the form of a message. The communication can be electromagnetic, e.g. over wired, wireless, or optical media, but this is not a requirement.

"Replication" refers to a process of repeating an update performed on one copy of a data object for another copy of the data object. In some instances, replication can be performed by propagating data (e.g. a new data object, or a new record or field) from an originating computer to a partner computer, while in other examples, replication can be performed by replicating an operation performed at the originating computer on the partner computer (e.g. deleting a record, sorting a table, or changing a status of a data object). While replication often refers to an update of a master copy of the data object being propagated to a slave copy of the data object, this is not a requirement. In some examples, the slave copy can be updated first, and subsequently replicated on the master copy of the data object. In other examples, neither of the two copies may be a master copy, or the copies of the data objects can be peers without any copy being designated as a master.

A "request" is a message to which a substantive response ("response") is expected, that is, a response beyond an acknowledgment. A request can also be a message for which a recipient of the message is expected to take a specified action. In contrast, a "notification" need not receive a substantive response, nor result in any specific action. Some requests of interest in this disclosure are requests for token activation or requests for update replication. A request from a sender to a receiver can variously be denied (proposed action by the sender is not allowed to proceed), approved (proposed action by the sender is allowed to proceed), accepted (proposed action is allowed to proceed, could be by either sender or receiver), rejected (proposed action is not allowed to proceed, could be at either sender or receiver), acted upon (proposed action is performed by the receiver), or refused (proposed action by the receiver is not performed). A request that is approved (to be performed at the sender) can also entail a related action being performed at the receiver, and similarly for other cases.

A "semantic check" is a determination of whether a proposed action is permissible, given a current state of a data object. A semantic check can be specific to a data object, a class of data objects, or an action; and can depend on functions or logic specific to that object or class of objects. For example, a semantic check on an invoice document can check e.g. payment status of the invoice, while a semantic check on a document for publication can check e.g. whether the document is work-in-progress or has already been published. In asymmetric embodiments, the semantic check can be different at computers fulfilling different roles. For example, a semantic check at a central finance computer can check payment status of an invoice, while a corresponding semantic check at a satellite computer can check whether the invoice is valid or e.g. has been marked for reversal. A semantic check "passes" or is "satisfied" if the proposed action is permissible. A semantic check "fails" or is "violated" if the proposed action is not permissible. While a semantic check can be similar to a check whether a data object is in use, the two checks are distinct. A semantic check can check process logic, and can be based on an instant data object for which a token request has been made; based on additional objects associated with a proposed action; or based on a software process that utilizes the instant data object (even if the software process does not update the instant data object). Additionally, a semantic check can be based on committed state of one or more data objects, while a determination that an object is in use can indicate that the object could have an unknown uncommitted state. Accordingly, a semantic check can pass based on the committed state of the object, but the object can be in use and subject to a local lock. Conversely, the object may not be in use (and not locally locked), but can fail the semantic check based on process logic. To illustrate, if an invoice is marked for payment, a proposed action to reverse the invoice can be impermissible (i.e. semantic check violated) even though the invoice is not actually in use at the time the semantic check is performed. Conversely, a proposed change in invoice terms can be permitted (i.e. semantic check passes) even though the invoice is actively in use in a payment process, because the proposed action can be determined not to interact with the ongoing process. A semantic check on a given computing node can include calls to software processes running on the given computing node, so as to determine a local state of the data object and related local processes. A semantic check on the given computing node can access multiple local data objects on the given computing node, which can include the data object for which token activation is requested, and/or other data objects. The semantic check logic can be self-contained and private on the given computing node, without being exposed to a partner computer.

A "server" is a computing system, implemented as hardware on which software is executed, providing one or more services or access to one or more resources for at least one client, and often for a plurality of clients. In this disclosure, servers can host software applications, token services, or can provide other functions.

The term "shared" refers to a data object having multiple copies available at respective computing systems or to respective software processes.

"Software" refers to computer-executable programs or instructions and associated data structures. Software can be in active or quiescent states. In an active state, software can be loaded into memory or undergoing execution by one or more processors. In a quiescent state, software can be stored on computer-readable media, awaiting transmission or execution.

A "store" or "repository" is an organization of data objects in a data storage apparatus.

A "token" is a mechanism for asynchronous access control between two or more software processes, applications, or computing systems. Specifically, a token can protect against two software processes making conflicting changes to respective copies of a shared data object. Each shared data object can have its own token. Tokens can protect data objects at any level, ranging from single bit flags, other atomic integer or string data, a record in a database, a database table, a document, or a higher level entity such as a manufacturing plant, vendor, or customer. Accordingly, a token for a given shared data object can be shared among two computers having respective copies of the shared data object, with each computer having its respective state of the token. At most one of the computers can have the token in an "active" state, meaning that the computer with the active token can perform new updates to the shared data object. In some examples, an active token can be required to read or use the shared data object, even if no new update to the shared data object is to be made. The remaining computers sharing the token and data object can have an "inactive" state of the token, meaning that each of the remaining computers is prohibited from performing a new update the shared data object until such time as it receives approval to activate the token locally. However, in contrast to new updates, a replication of an update can be performed regardless of whether the token is locally active or inactive, because the update being replicated has already been performed at the partner computer. A token can restrict access, for new updates to the shared data object, to at most one computing system at a time. Each computing system sharing the token can also have respective counters ("token counters") or other variables ("token variables") for tracking state or managing token logic, as described further herein. A token mechanism can be asynchronous insofar as updates made at a first computing system can be replicated by a second computing system (on its own copy of the shared data object) asynchronously, e.g. at a later time, and the first software process can make further updates to its own copy of the data object before a preceding update has been replicated by the second software process. However, a token mechanism can also enforce that each computing system apply updates in the same order. In some examples described herein, tokens can be managed between computing systems, with each computing system maintaining its own state and other variables of a shared token. However, this is not a requirement and, in other examples, a disclosed token framework can manage tokens between software processes on a single computing system (each process having its own copy of shared data and token variables) or between two clusters of computers (each cluster having its own copy of shared data and token variables). For convenience, the description sometimes uses terms such as "active token" to refer to a token having an active state locally at a given computing system. Similarly, expressions such as "receive the token" or "release the token" are used as shorthand to refer to changes in the state of the token at a given computing system, or to a transfer of the active state from one computing system to another. When a request for a token by a given computing system is accepted, it means that the given computing system is authorized to change the token's state at the given computing system to "active." A token can have persistence across multiple transactions.

A "token framework" is a software framework providing services for managing tokens for sharing data objects safely and with consistency. A token framework can be implemented with a token management layer at each participating computer. In further examples, the token framework can operate as a distributed peer network of two or more token management layers at respective computing systems coupled by a communication network. In other examples, a central host can provide shared services or can mediate communications between the token management layers of participating computing systems. A token framework can provide a single simple interface through which a new or existing software application can utilize token management services for protecting shared data objects and their associated software processes.

A "transaction" is an operation that uses a data object. While an update is a transaction, a transaction need not change the state or value of the data object and accordingly some transactions are not updates. However, non-update transactions can also be at risk of concurrent updates to a common data object, and can benefit from protection offered by a token framework as disclosed herein. Further, a particular software action can be a transaction with respect to a first data object (e.g. the first data object is read but not modified) and can also be an update with respect to a second data object (e.g. the second data object is created or modified). One or both of the first and second data objects can be shared data objects protected by a disclosed token framework.

An "update" is an operation that changes a state or a value of a data object. To illustrate, an update to an integer data object can change its value from 5 to 6, an update to a document can add a sentence or change the formatting of the document, or an update to a data structure can change a value of a field e.g. from "current" to "obsolete." An update can add, modify, or remove data items from a data object. An update can create, initialize, or delete an entire data object. An update can change the state of a data object e.g. from read-write to read-only. A replication of an update (on a first copy of a data object) is an update (on a second copy of the data object). A sequence of updates can be performed atomically (i.e. with a single commit when all updates of the sequence are complete) as a single update. A "new" update is an update that has not previously been made on a partner computer, while a replication is an update that has previously been made on a partner computer. Further, where the unqualified term "update" is used in this disclosure, it can be understood also to pertain expressly to a new update, unless repugnant to the context.

An update can have an "update type" which can provide information about a proposed update that distinguish it from other possible updates. In some examples, the update type can be data oriented. A data-oriented update type can include e.g. addition, modification, or deletion of one or more fields of the data object, and can additionally or alternatively indicate which field or fields of the data object may be affected by the proposed update. In other examples, the update type can be functionally oriented. A functionally-oriented update type can be specific to a particular domain of a software application using the data object. In a manufacturing application, data object updates can include logs or statistics associated with individual production items, inventory updates, or logging and resolution of problem reports. In a business application, data object updates can include for example payment or reversal of invoices, purchase order functions, shipping/receiving, or payroll functions.

"Verification" refers to making a determination that a condition is met. Thus, verification can be distinguished from "checking," which permits both outcomes: the condition is met, or not met.

First Example Updating Method

FIG. 1 is a flowchart 100 of a first example method for updating a data object. In this method, an update at a first computer is enabled by receipt of a token from a partner computer.

At process block 110, a first computer, on which a software application seeks to update a data object, can make a determination that a corresponding token is inactive on the first computer. The determination can be made by a token layer installed on the first computer, as a service to the software application.

At process block 120, the first computer can issue a request for token activation. The request can be issued by the token layer, can be issued directly to a partner computer having the token in an active state, or can be routed to the partner computer, by external infrastructure of a token framework.

Responsive to the request, at process block 130, the partner computer can verify that a semantic check for the data object is satisfied. The semantic check can verify that any pending or performed logic on the data object is in a state consistent with allowing the first computer to update the data object. To illustrate, if all known updates to the data object at the partner computer have been completed, then the first computer can be allowed to perform its update. However, if the state of the data object at the partner computer indicates that the update should not be allowed (e.g. the data object is marked obsolete, or an invoice data object is marked reversed) or indicates that an update by the first computer could lead to an inconsistent state of the data object or an associated software process, then the semantic check can fail. These and similar scenarios notwithstanding, FIG. 1 illustrates a scenario where the semantic check is satisfied, and verified as satisfied at process block 130. Accordingly, at process block 140, the token is released at the partner computer, which can render the state of the token inactive at the partner computer, and a message confirming the release is conveyed to the first computer as indicated by the arrow leading from block 140 to block 150. Responsive to the token release, at process block 150 the object can be updated at the first computer.

Numerous variations and extensions of this method can be implemented, some of which are described in context of FIG. 3 below.

Example Data Structure

Figure 2:
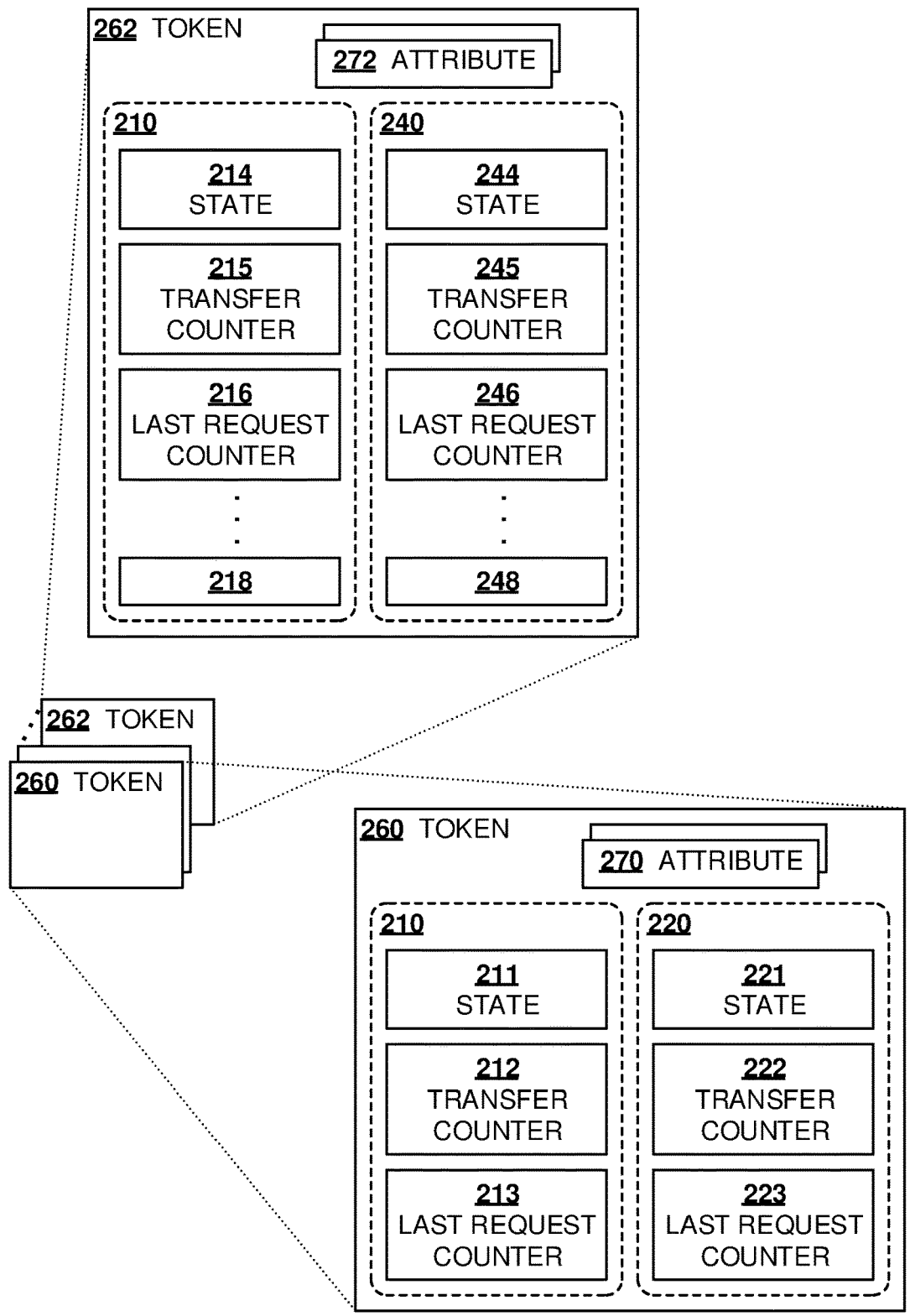
FIG. 2 is a diagram illustrating example token data structures according to the disclosed technologies.

FIG. 2 is a diagram 200 illustrating token data structures. A plurality of tokens 260-262 for respective data objects are shown, with further details for tokens 260, 262. However, the plurality of tokens illustrated is not a requirement, and the disclosed technologies can be implemented with as few as just one token for a single shared data object, or just two tokens for a pair of data objects.

Token 260 (and its associated data object, not shown) is shown shared between two computing systems 210, 220. Token 260 has a respective state 211, 221 at each computer 210, 220. Generally, the token can be active at only one of computers 210, 220 at any given time. Further, with break-before-make logic, a token active at computer 220, can be released, or rendered inactive, at computer 220 before it is available to be activated at a requesting computer 210. Still further, token logic can support the token being in an inactive state simultaneously at both computers 210, 220, which can simplify the process of requesting and obtaining a token, and can be preferred for data objects that are only infrequently updated. In this illustration, token 260 can support replication requests from computer 210 to computer 220, and can support requests for token activation in both directions.

Token 260 can also include a transfer counter 212 and a last request counter 213 for computer 210, with similar counters 222, 223 at computer 220 as shown. Transfer counter 212 can indicate a number of replication requests issued from computer 210 to computer 220 for the associated data object. Although, in principle, updates to the associated data object at computer 210 can be replicated on computer 220, because of the asynchronous nature of update replication, a first update at computer 210 may still be pending at computer 220, leading to different values of the transfer counters 212, 222 at a given moment. Under normal operating conditions (e.g. no outages), and with a quiescent state of the associated data object (e.g. no further updates at any computers sharing the data object), the transfer counters 212, 222 can eventually reach a same value. In some examples, transfer counters 212, 222 can increase or can be reset, but cannot decrease otherwise.

As discussed further herein, a comparison of transfer counters at a first computer can be used to detect a state of the associated data object at another computer. To illustrate, under quiescent conditions of the associated data object, transfer counters 212, 222 can both have reached, say, 9. An update at computer 210 causes transfer counter 212 to be incremented to 10, and the incremented transfer counter can be included in a replication request to computer 220. A replication request containing a transfer counter (212=10) one ahead of a local transfer counter (222=9) can be detected as a normal condition at computer 220. In contrast, if the request specifies transfer counter 212=11 (two ahead of local counter 222=9), computer 220 can detect that a prior update (e.g. a replication) is still pending at computer 220, and can wait to perform the requested replication until the prior update (replication) has been completed at computer 220. That is, a local transfer counter more than one behind a transfer counter received in a replication request can indicate at least one pending prior update at a computer receiving the request. No check of transfer counters 212, 222 is required at computer 210, which issues the replication request.

Similarly, a request for token activation can normally be issued with a transfer counter matching the transfer counter at the receiving computer. To illustrate, receiving computer 220 can normally receive a token activation request from sending computer 210 containing "9" as the transfer counter 212, while the local transfer counter 222 at computer 220 is also 9. In contrast, if the request has a transfer counter 212 that is greater than 9, then computer 220 can detect that there are one or more updates (e.g. replications) pending on computer 220. However, the determination to approve the token activation request can be independent of the transfer counter values, and can depend on whether the token 260 is active or inactive on computer 220, or whether a semantic check on computer 220 passes. However, in the opposite direction, a token activation request from computer 220 to computer 210 can be denied if the transfer counter 222 of the request is behind (less than) the local transfer counter 212.

Computer 210 can also keep track of the value of the token transfer counter at the last token activation request received by computer 210, as last request counter 213.

Unlike token transfer counters 212, 222, the last request counters 213, 223 can retain divergent values. For instance, if all updates are performed on computer 210 and replicated at computer 220, the last request counter 223 on computer 220 can progressively increase. However, if computer 220 never requests the token from computer 210, the last request counter 213 can remain pegged at its default initialization value, which can be zero. That is, last request counter 213 may not be used and can be omitted. Like the token transfer counters 212, 222, the last request counters 213, 223 can also be used to diagnose conditions of the token management logic. Upon receipt of a replication request with token state marked active, computer 220 can compare its last request counter 223 with token transfer counter 212 to determine whether to activate the local token state 221.o illustrate, computer 220 can receive a replication request specifying a transfer counter 212=15, when its last requested counter 223=12, and this can be detected as a normal event indicating that three updates have occurred on partner computer 210 since the last token activation request received at computer 220. Thus, if the replication request designated the token to be active on computer 220, then computer 220 can proceed to activate the token and fulfill the replication request. However, if the replication request specified transfer counter 212=15 when the local last requested counter 223=16, then this can be detected as an indication of additional pending updates to be replicated, and computer 220 can defer activation of the token until additional replication requests (e.g. for a transfer numbered 16) are received. That is, a last requested counter ahead of a transfer counter in a replication request can indicate one or more updates pending at the receiving computer.

Token 260 can also have additional attributes 270 which can be common across participating computers 210, 220. These attributes 270 can include static attributes or dynamic attributes. An example static attribute 270 can be a reference to the associated shared data object, or to another controlled software entity, such as a process or node of the associated software application. Another static attribute 270 can be a process identifier or a semantics identifier that defines which semantic check can be applied for managing the token. To illustrate, the semantics identifier can be "document publication status" for a published document, "clearing status" for an invoice document, or equivalent keys for such descriptive strings. In examples, a common semantics identifier can be associated with different semantic checks at two participating computers, according to their respective roles. An example of a dynamic attribute can be a last-modified time stamp indicating the most recent time any activity (such as a request, or a release of active status) has occurred on token 260.

FIG. 2 also illustrates another token 262, which can be shared among computing systems 210, 240. Similar to token 260, token 262 has a state 214, 244 at the respective participating computers 210, 240. Generally, the token can be active at no more than one among computers 210, 240 at any given time. Further, with break-before-make logic, a token active at, say, computer 210, can be released, or rendered inactive, at computer 210 before it is available to be activated at a requesting computer, say computer 240. Still further, token logic can support the token being in an inactive state at all participating computers. The token 262 can support replication requests from computer 240 to computer 210, and can support token activation requests in both directions.

Token 262 can also include transfer counters 215, 245 and last request counters 216, 246 for computers 210, 240 respectively. The transfer counters 215, 245 generally behave similarly to transfer counters 212, 222 described herein. For example, because of the asynchronous nature of update replication, 215, 245 can have different values at a particular time. The last request counters 216, 246 generally behave similarly to last request counters 213, 223 for token 260. Comparisons of transfer counters, between a computer sending a request for token activation or replication and another computer receiving the request, can be used to detect a state of the associated data object at another computer, or to detect errors.

In some embodiments, additional token variables 218, 248 can be maintained by computers 210, 240. For example, a second set of transfer counters similar to counters 215, 225 can be used to support replication requests in a reverse direction, i.e. from computer 210 to computer 240. Other possible uses of additional token variables 218, 248 can include flags designating priority for a given data object at a given computer; or performance monitoring parameters, such as time at which a pending token activation request or a pending replication request was received or issued. Such variables can be used to support additional features of token management logic, such as efficiently directing requests to a partner having the active token, or to support fairness in processing requests. Token 262 can also have common attributes 272 similar to the common attributes 270 of token 260.

The computers sharing a given token (260 through 262) can vary dynamically over the lifetime of a token, as computers are put into service or taken out of service. Additionally, as special projects are implemented on specific computers requiring shared access to previously existing unshared data objects, tokens can be dynamically introduced to support sharing. Upon completion of a special project, the token can be destaged and the shared data object can revert to being an unshared data object.

Although the detailed views of tokens 260, 262 show matched fields across all computers for a given token, this is not a requirement. To illustrate, token 260 can omit last request counter 213 for computer 210 in a design where partner computer 220 is known never to make a token request.

Second Example Updating Method

Figure 3A:
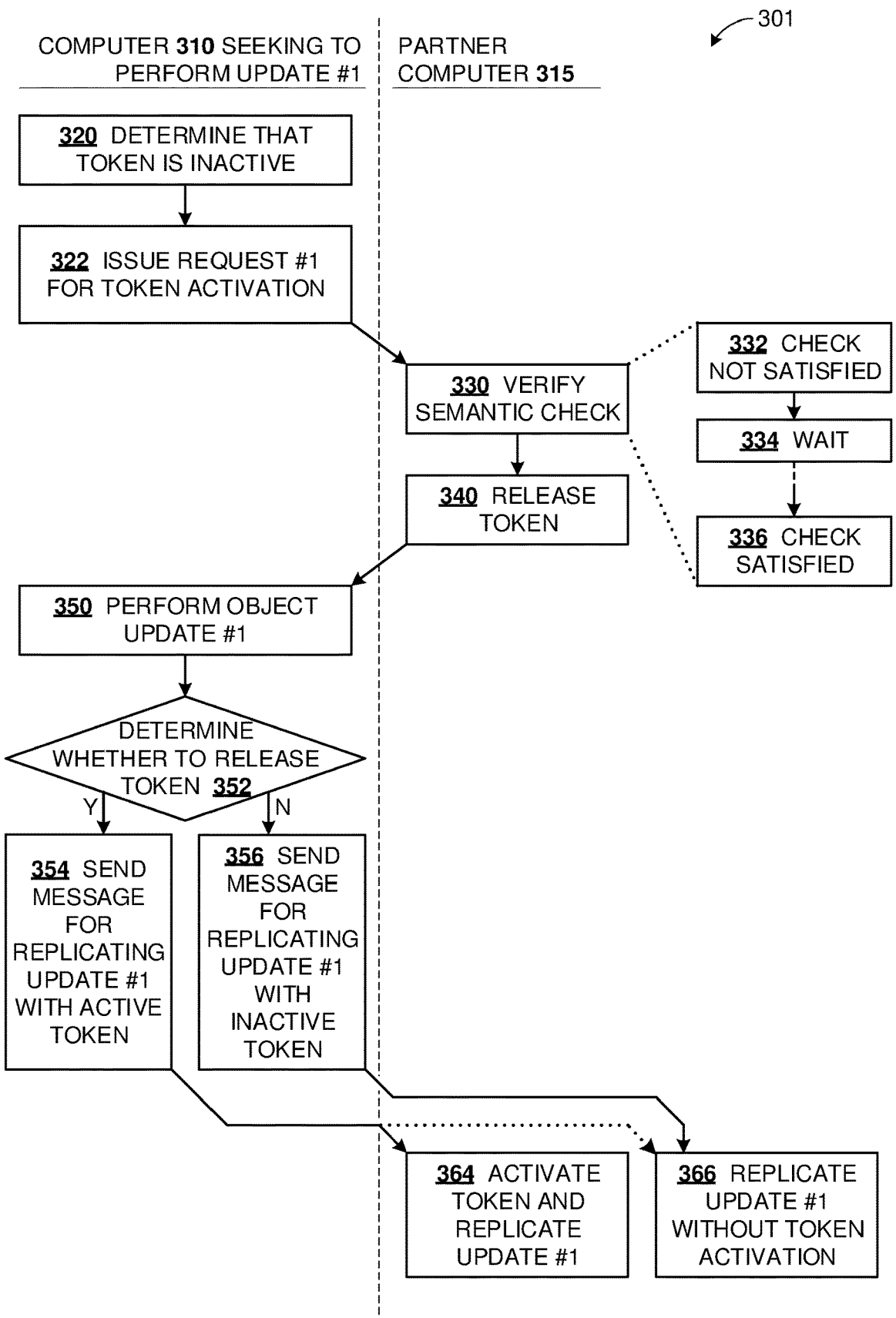
FIGS. 3A-3B are parts of a flowchart of a second example method for updating a data object according to the disclosed technologies.
Figure 3B:
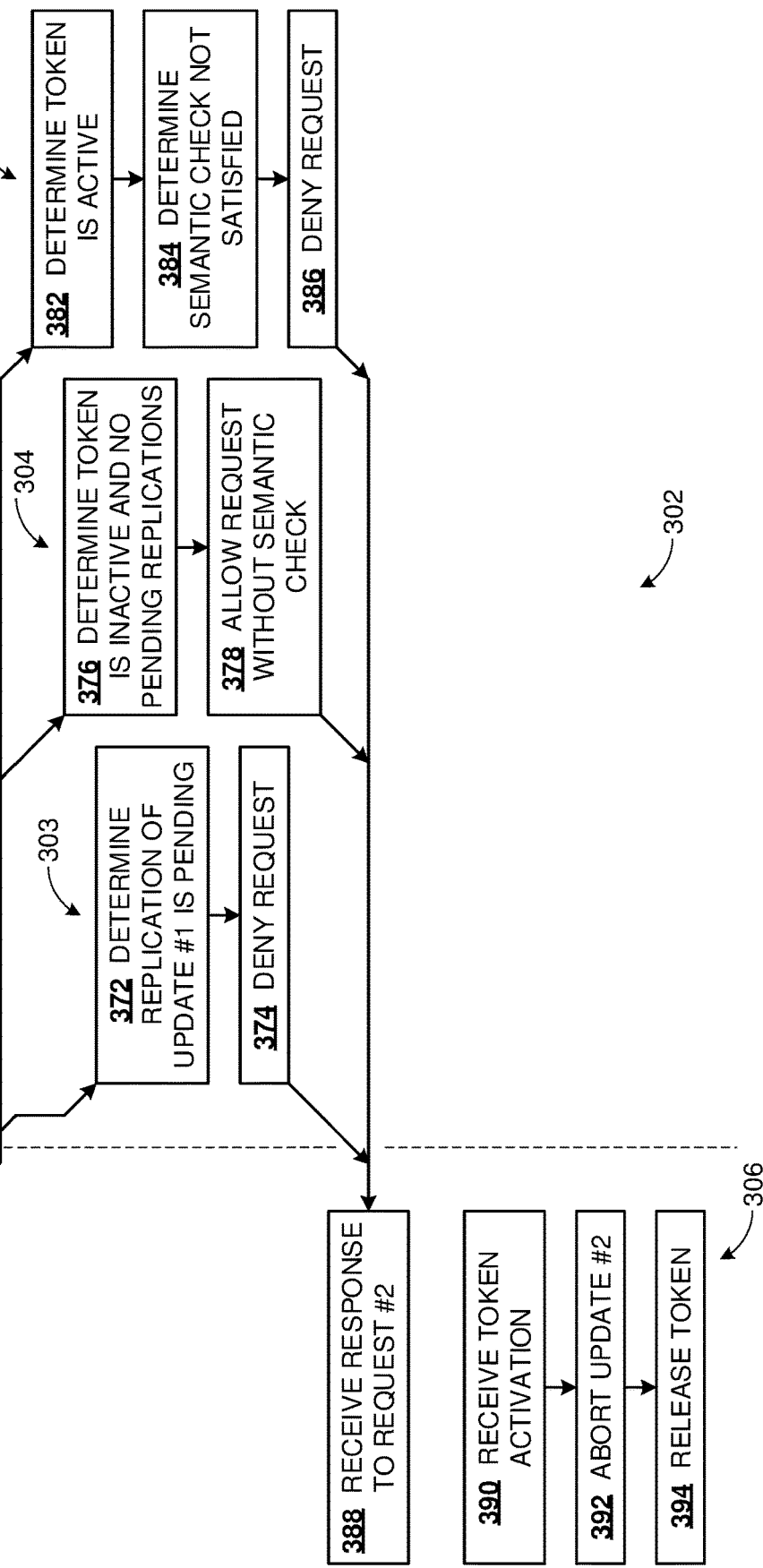

FIGS. 3A-3B are parts 301, 302 of a flowchart of a second example method for updating a data object. Certain aspects of the second method are similar to the first updating method, while other aspects illustrate additional or alternative logic and handling of various scenarios that can be encountered and handled by examples of the disclosed technologies.

Similar to FIG. 1, a software application on a first computer 310 can reach a point requiring it to update a data object ("Update #1"). At block 320, a determination can be made that a token for the data object is inactive on first computer 310. Thus, at block 322, a first request ("Request #1") can be issued from first computer 310. At process block 330, responsive to the request received from block 320, partner computer 315 can verify a semantic check on the associated data object.

In the illustrated example, the semantic check is verified at block 330 and the token can be released at block 340. Instead, if the semantic check fails, then the token may not be released and the request from block 322 can be denied and indicated as denied in a response sent to computer 310. However, this is not a requirement, and in other examples, a token request handler can block until a semantic check passes. Process blocks 332, 334, 336 depict an example of block 330 where the check verification at process block 330 waits till the semantic check clears. At process block 332, a determination is made that the semantic check is not satisfied, as a result of which the semantic check procedure can wait or block at process block 334. Eventually, the condition causing semantic check failure can clear (e.g. by completion of an update on partner computer 315). The semantic check procedure can resume and a determination can be made at block 336 that the check is satisfied, completing block 330. Then, partner computer 315 can release the token at block 340. Releasing the token can include setting the token state to inactive on partner computer 315 and notifying first computer 310, directly or indirectly, about the freed token status.

With token released by partner computer 315, the first computer can perform Update #1 on the data object, at block 350. At decision block 352, a determination can be made whether to release the token at first computer 310. This determination can be made on the basis of expected efficiency, e.g. to reduce the overhead of token activation requests. In some instances, an affirmative determination can be made, and the method can follow the Y branch from block 352 to block 354, where a replication request can be issued to the partner computer for replication of Update #1 at the partner computer. The replication request can designate that the token for the instant data object be active on the partner computer. The affirmative determination can be made based on various factors including, without limitation: a determination that a subsequent update is likely to be requested at partner computer 315; partner computer 315 having higher priority for the token than the first computer; or one or more unfulfilled requests for the token.

In other instances, a negative determination can be made at block 352, and the method can follow the N branch from block 352 to block 356. Similar to block 354, a replication request can be issued at block 356 for replication of Update #1 at partner computer 315. However, the replication request from block 356 can designate the token as inactive on partner computer 315. The negative determination can be made based on various factors including, without limitation: a determination that a subsequent update to the instant data object is imminent on first computer 310; or partner computer 315 having lower priority for the token than the first computer 310.

Blocks 354, 356 lead to blocks 364, 366 at partner computer 315. At block 364, partner 315 can respond to the replication request by activating the token on the partner computer and replicating Update #1. Although this can be a normal flow of the method, in some situations the token can be left inactive on partner computer 315 even though token activation was indicated in the replication request message at block 354. Such a situation can arise, for example, if the local transfer counter on partner computer 315 is greater than or equal to the transfer counter received in the replication request. In such situations, the method can proceed from block 354 to block 366 as indicated by dotted arrow in FIG. 3A.

At block 366, Update #1 can be replicated without token activation. That is, an active token is not a requirement for performing a replication. Further the replication at blocks 364, 366 can be performed asynchronously, which can be 10-1000 ms, 1-3600 s, 1-24 hours, or even longer, after receipt of a replication request issued at blocks 354 or 356.

In other examples, replications can be performed synchronously, e.g. within 10 ms from receipt of a replication request.

The method proceeds to FIG. 3B, with flowchart 302 continuing flowchart 301. Subsequent to processing of Update #1, the software application on first computer 310 is shown to have reached a point where a second update ("Update #2") to the instant data object is required. Similar to the determination at block 320 for Update #1, the token can be at an inactive state on first computer 310. Accordingly, at block 370, another request ("Request #2") for token activation can be issued to partner computer 315.

The right-hand side of flowchart 302 illustrates several scenarios 303-305 that partner computer 315 can encounter.

Beginning with scenario 303, partner computer 315 can determine at block 372 that replication of Update #1 is still pending locally on partner computer 315. This can happen, for example, if partner computer 315 was given the token (e.g. via block 354) but was busy with other tasks and has not yet completed the replication of Update #1. Then, at block 374, the token activation request from block 370 can be denied and notified to first computer 310.

In another alternative scenario 304, a determination can be made at block 376 that there is no pending replication associated with this token, and further that the token is inactive at partner computer 315. This can happen, for example, if the token was released (e.g. inactive at both computers 310, 315 after completion of block 364). In this scenario, partner computer 315 has no privilege or activity with the instant data object. The request can be allowed without performing any semantic check at block 378, and notified accordingly to first computer 310.

In a further scenario 305, partner computer 315 can determine at block 382 that it has the token in an active state. At block 384, the semantic check can be found to fail, leading to denial of the token activation request at block 386, with notification to the requesting computer 310. In all scenarios 303-305, at block 388, the requesting computer 310 can receive a response to Request #2 from partner computer 315 as described above, and can proceed accordingly as described herein.

In another scenario 306, first computer 310 can receive token activation at block 390. This can happen via block 378, for example. With token in its possession, either activated or ready to be activated, computer 310 could proceed with Update #2. However, in scenario 306, Update #2 can be aborted at block 392. The abort of Update #2 can variously occur before execution of Update #2, during execution, or after execution but before Update #2 has been committed. The token can be released at block 394. In varying examples, the released token can be inactive at all computers, returned to be active on partner computer 315, or transferred to another computer.

In some examples, a semantic check can be defined for a data object or for a class of similar data objects, and can be uniformly performed for all transactions causing updates to the data object, or for the computing nodes sharing the data object. In further examples, different semantic checks can be performed at two computing nodes, according to differing functional usage of the data object at those two computing nodes. To illustrate, if deletion of the data object is the responsibility of computing node A, but not of computing node B, then a token request from node A could pertain to deletion of the data object and a semantic check at node B can check that software processes at node B can tolerate the deletion of the data object. But, because a request from node B would not pertain to deletion of the data object, a semantic check at node A can omit corresponding checks with respect to processes at node A.

In further examples, an update type can be specified in a token request (e.g. at block 322) and the semantic check (e.g. at block 330) can be based on the update type. Continuing the above illustration, if the desired update at node A is (or, is not) a deletion, then the semantic check on node B can perform (or, omit) the checks associated with deletion of the data object. In an additional example, a desired change at computing node C, can involve a first component of a data object, and can be independent of other components of the data object being used in a long-running process on computing node D. In such case, an update on node C can be allowed to interrupt the process on node D. However, in a counterexample, the requested type of change on node C can have a potential for rendering the data object in an inconsistent state at node D, and the semantic check can fail until the process on node D has completed.

Scenario 304 illustrates an example where a token can be inactive at the participating computers. Because a subsequent token activation request can be handled without performing a semantic check, efficiency of handling the request is improved. However, in other examples, a token can be configured to always be active at one of the participating computers. (Here, "always" excludes the short period of time where token activation is being switched from one computer to another.) The token can remain with a computer where it was last used (e.g. to complete a replication), or the token can default to being active at a designated computer. Such a token configuration can be efficient when most updates to a shared data object are performed at the designated computer. Further, within a single distributed software application, different configurations can be used for different tokens. For example, a first token can revert to an idle condition, with inactive state at all participating computers; a second token can default to being active a computer A; while a third token can default to being active at another computer B.

The description proceeds to methods of replicating an update performed at a source computing node.

Third Example Update Method

Figure 4:
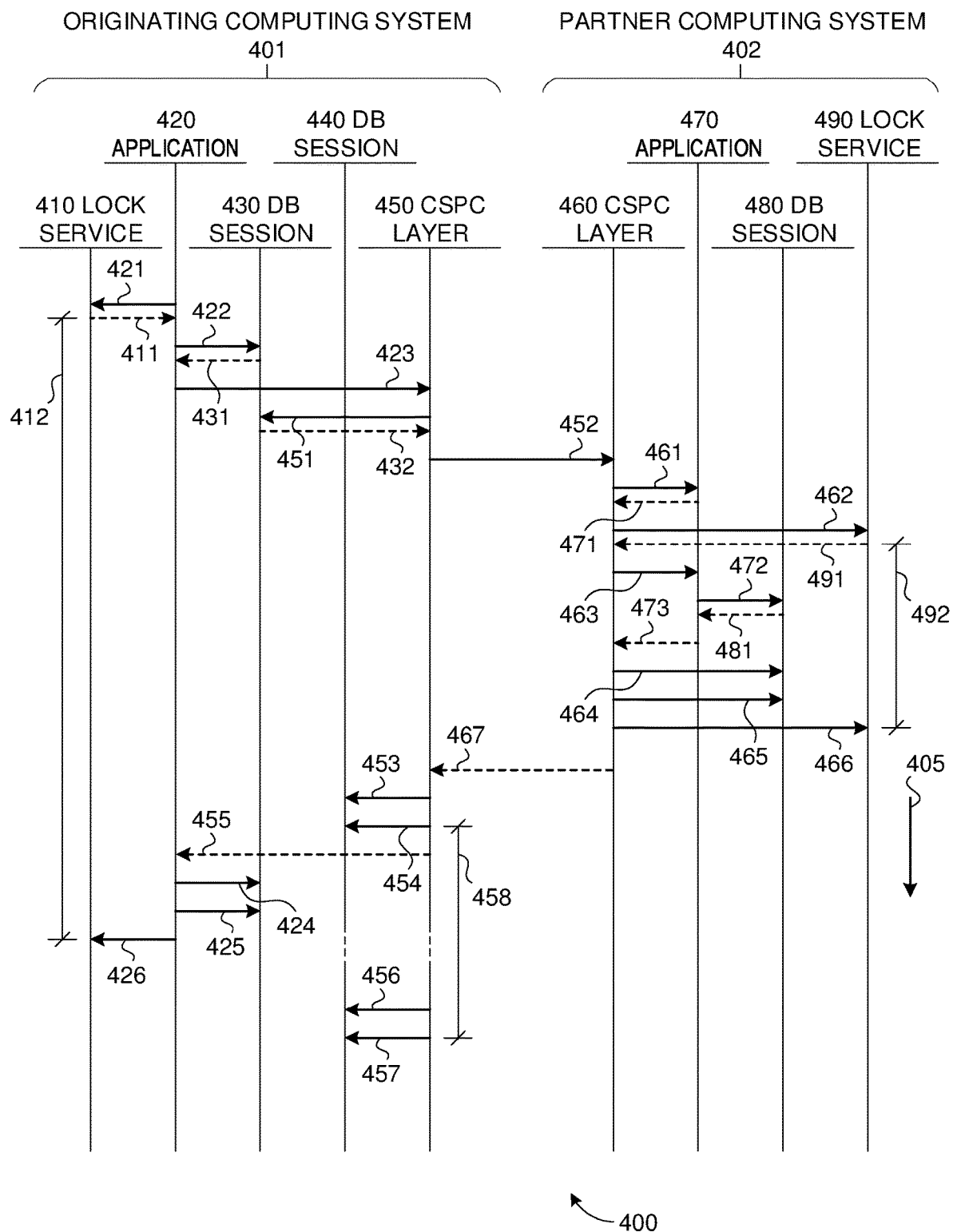
FIG. 4 is a sequence diagram of a third example method for updating a data object according to the disclosed technologies.

FIG. 4 is a sequence diagram 400 of a third example method for updating a data object according to the disclosed technologies. In this method, an originating computer requests a token from a partner computer and performs an update to a data object. Tokens and locks are used in conjunction. As indicated by arrow 405, time flows downward in diagram 400. In diagram 400, requests and other unsolicited messages are indicated by horizontal solid arrows (e.g. arrows 421, 452), and corresponding responses are shown as dashed arrows (e.g. arrows 411, 467). For simplicity of illustration, acknowledgment messages and return-of-control are omitted from diagram 400.

Software applications 420, 470 can execute on originating computing system 401 and partner computing system 402 respectively. The computing systems 401, 402 can have lock services 410, 490 and database ("DB") sessions 430, 440, 480 as shown. The DB sessions 430, 440 are illustrative: one, two, or more than two DB sessions can be implemented at each of the computing systems 401, 402. DB sessions 430, 440 can access the same database objects in any pattern, so that, for example, a given token or data object can be read by one DB session 430 and written by another DB session 440. Furthermore, in some circumstances, a DB transaction can cause a new DB session to be opened to handle the DB transaction.

The token framework can be supported by cross-system process control ("CSPC") layers 450, 460 on computing systems 401, 402 respectively. Application 420 can invoke functions of CSPC layer 450 to obtain token services for an update to a data object. In turn CSPC layer 450 can request token activation from partner CSPC layer 460, which in turn can call functions integrated into application 470 to make a decision on the received token activation request. With token activation granted, the token can be activated at the originating computer 401, and the desired update to the data object can be performed. The token operations can also be protected locally by independent locks at computers 401, 402. The locks can be provided by a lock services 410, 490 on the two computers 401, 402.

The method begins with application 420 making a determination that an update to a data object is required. At arrow 421, application 420 requests a lock on the data object as would be normal on a stand-alone system (i.e. where linked software processes are hosted on a single computing system, with no sharing of the data object between two computing systems). The local lock is granted at arrow 411, and application 420 can proceed to read the data object from DB session 430 at arrow 422, with the value of the data object being returned to application 420 at arrow 431. In this illustration, local read of the shared data object can be performed without invoking token services.

Application 420 next seeks to write (update) the data object, but consistency can require that this update be coordinated with application 470 on partner computer 402. Thus, instead of directly writing the data object (locally protected by the local lock granted at arrow 411), application 420 can issue a request to CSPC layer 450 for permission to update (write) this data object at arrow 423. At arrow 451, CSPC layer 450 can query DB session 430 for the state of the token corresponding to the instant data object. The token state (in this illustration, "inactive") can be returned to CSPC layer 450 at arrow 432.

Because the token is locally inactive, CSPC layer 450 can request token activation from partner CSPC layer 460 at arrow 452. Handling the token activation request can require performing a semantic check on partner computer 402 as to processes associated with the shared data object. In order to perform the semantic check, one or more local data objects can be accessed. In some examples, the local data objects can include the local version of the shared data object, while in further examples, other data objects can be required for the semantic check. The required local data objects can include the local state or other local variables of the requested token. Thus, on the partner computer 402, CSPC layer 460 can query application 470 at arrow 461 to determine which data objects or locks are required to handle the token activation request, and application 470 can provide the query response at arrow 471. The required locks can be requested locally at arrow 462 from lock service 490, and these local locks can be granted at arrow 491. With suitable lock(s) obtained, CSPC layer 460 can issue a callback to application 470 at arrow 463 to perform a semantic check for the requested token. At arrow 472, application 470 can query the required (and locally locked) data objects from local DB session 480, and can receive the queried data values at arrow 481. Application 470 can use these data values to perform the semantic check, and can return the result of the semantic check to CSPC layer 460 at arrow 473. In this illustration, the semantic check is successful. With semantic check complete, CSPC layer can deactivate the token locally, at arrow 464, can commit the token state at arrow 465, can release local locks at arrow 466, and can respond to the token activation request (arrow 452) at arrow 467.

In the illustration of diagram 400, the response at arrow 467 is an approval of the token request. Upon receipt of this approval 467, CSPC layer 450 can activate the token at arrow 453, can commit the token state at arrow 454, and can respond to the permission request (arrow 423) at arrow 455. In this illustration, permission to update the instant data object is granted at arrow 455. Accordingly, application 420 can update (write) the data object at arrow 424, can commit the updated data object at arrow 425, and can release the local lock at arrow 426.

Numerous variations and extensions can be implemented within the scope of the disclosed technologies. As one example, the required locks at arrows 462/491 can be unavailable at partner computer 402, and accordingly CSPC layer 460 can be unable to invoke the semantic check. This circumstance can be treated as a failed semantic check, and token activation request 452 can be denied, for retry at a later time.

The timescales of local lock utilization are generally fast. Locks on partner computer 402 can have a duration 492 on the order of 1-10 ms, while locks on originating computer 401 can have a duration 412 on the order of 10-100 ms. Also shown in diagram 400 are arrows 456, corresponding to deactivation of the token, and 457, corresponding to commit of the deactivated token state. In some examples, the duration 458 of the token active state can be short, on the order of 10-100 ms, e.g. if the token is released after a single update to the data object. In other examples, the token can be maintained active at originating computer 401 for a series of transactions involving the data object, and the active duration 458 can be in a range 1-100 s, 100 s to 1 hour, 1 hour to 1 day, or even longer.

First Example Replication Method

Figure 5:
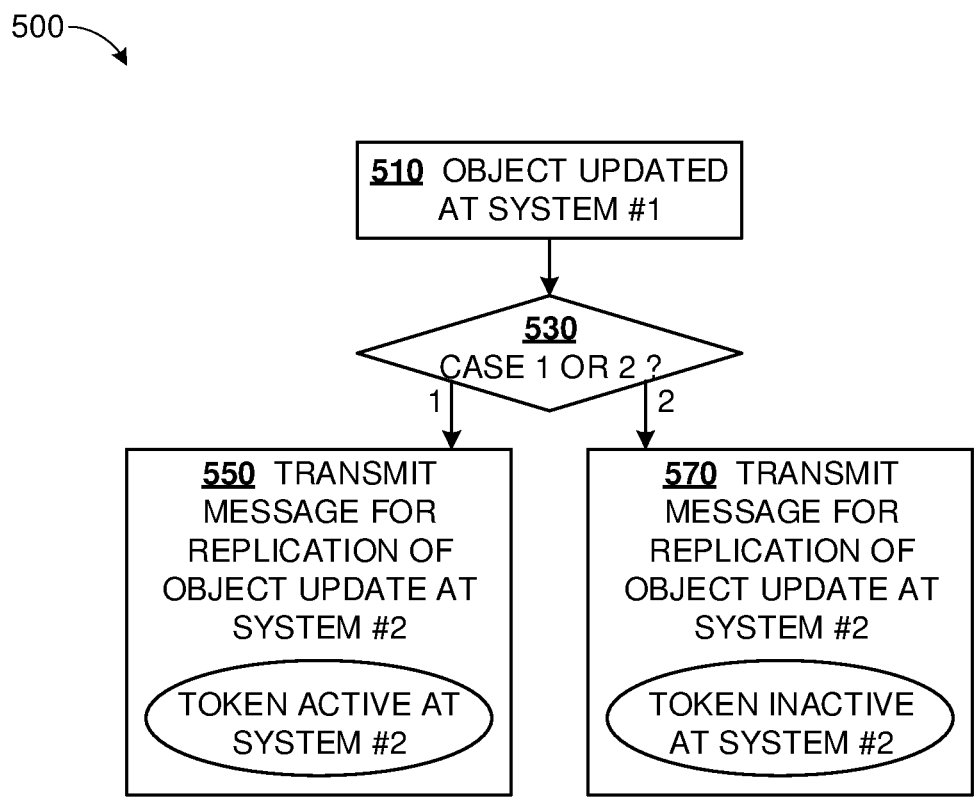
FIG. 5 is a flowchart of a first example method for replicating an update to a data object, according to the disclosed technologies.

FIG. 5 is a flowchart 500 of a first example method for replicating an update to a data object. In this method, a replication request for an update on a data object is issued with a conditional state of the token for the data object.

At process block 510, the data object can be updated on the source system ("System #1"). At decision block 530, a determination is made between two cases. The determination can be based on where a next transaction on the data object is likely to originate. In a first case, the "1" branch is followed from block 530 to block 550. A message is transmitted from System #1 requesting replication of the data object update, with a designation of the token as active at a computing node receiving the request. In a second case, the method can follow the "2" branch from block 530 to block 570. Like block 550, a message is transmitted requesting replication of the data object update. However, the message transmitted at block 570 can designate the token as inactive at the receiving computing node.

Second Example Replication Method

FIGS. 6A-6C are parts 601, 602, 603 of a flowchart of a second example method for replicating an update to a data object. Certain aspects of the second method are similar to the first replication method, while other aspects illustrate additional or alternative logic and handling of various scenarios that can be encountered and handled by examples of the disclosed technologies.

At block 610, an object can be updated at a first computing system ("System #1"). In conjunction with the update, the token transfer counter ("TTC #1") of System #1 can be incremented at block 612.

Decision block 614 can be similar to block 530 of FIG. 5, deciding among two cases for managing the token associated with the updated data object. At decision block 614, a co-resident software application can provide an indication whether the next transaction (e.g. a follow-on transaction) on the updated data object is anticipated at System #1. If not, block 614 follows the N branch, leading to block 650. If another transaction on the data object is anticipated at System #1, then the method can follow the Y branch from block 614 to block 670. Otherwise, the method can follow the N branch to block 645 for deactivation of the token at System #1, and thence to block 650.

Both blocks 650, 670 perform a message transmission for replication of the data object update at another computing system ("System #2"). The message can include the incremented transfer counter TTC #1. However, the message transmitted by block 670 indicates that the token status at the receiving node System #2 can remain inactive, while the message transmitted by block 650 can indicate that the System #2 can have the token in an active state. Then, responsive to both object and TTC #1 having been updated and the replication request having been issued, the object update and replication request can be committed at block 616. In some examples, the commit can be performed after block 614 but before the replication messages are transmitted at blocks 650, 670.

The method can continue according to illustrative scenarios 602-603 of FIGS. 6B-6C. Beginning with scenario 602 of FIG. 6B, arrows 650A, 670A represent the replication request messages received from blocks 650, 670 respectively. At block 662, System #2 can update its copy of the token transfer counter TTC #2, setting it equal to the value of TTC #1 received in message 650A or 670A. In some instances, the actual value of TTC #1 can have advanced further before block 662 is performed.

In scenario 603 of FIG. 6C, arrow 650B represents a message received from System #1 via block 650, which puts the token in an active state at System #2. The message of 650B can be the same message as 650A, or can be a similar message from a different update transaction on the instant data object. At block 652, a determination can be made that a prior update is pending at System #2. In examples, this determination can be made by comparing TTC #1 with the value of TTC #2 before receipt of message 650B. With a prior update pending and the token in an active state, System #2 can proceed to complete the pending update at block 654, followed by completion of the replication of the new update at block 656. In varying examples, the pending update detected at block 652 (and performed at block 654) can be a replication of an update originated by System #1; a replication of an update originated on another computing system; or an update originated at System #2 which could not be completed earlier because System #2 did not have an active token for the data object.

First Example System Architecture

FIG. 7 is a block diagram 700 of a first system architecture implementing an example of the disclosed technologies. Diagram 700 illustrates a system with two computing nodes using a token framework as disclosed herein to coordinate transactions on copies of shared data objects.

Computing node 710 is illustrated having two software processes 722, 728 operating on data objects 726 maintained in storage 724 as illustrated. Token management software layer 730 can provide token management services to one or both processes 722, 728. Token management layer 730 can communicate with a partner token management layer 740 of computing node 750 through a network 735. Token management layers 730, 740 can implement a token framework for protection of data objects having shared usage at computing nodes 710, 750. Like node 710, computing node 750 can execute a plurality of software processes 752, 758 accessing data objects 756 resident on storage 754 as illustrated. Some or all of data objects 726, 756 can be copies replicated between computing nodes 710, 750. In examples, the token management layers 730, 740 can execute instructions stored on computer-readable media as described in connection with FIG. 8 or 9, or can perform other token management functions described in context of FIGS. 1-6. Token layers can provide persistent storage for tokens across transactions and across successive instances of software processes that read or write associated shared data objects.

In the system of FIG. 7, token layers 730, 740 can communicate directly with each other over a public or private data communication network 735. That is, token layers 730, 740, together with optionally additional token layers on other participating computers, can form a distributed peer network with no central token management authority. Such an architecture can be advantageous for scalability of a token management framework across a large number of participating computers. By incorporation of suitable software interfaces in token layers 730 or 740, configuration operations can also be performed directly from an administrator console on token layer 730 or 740. In some examples, configuration information can be replicated from one token layer (e.g. layer 730) to another (e.g. layer 740).

First Example Token Layer Software

FIG. 8 is a diagram of first example software 830 providing token functions at an originating computing node such as node 710. Software module 811 includes instructions used for managing an update to a document protected by a token framework. The instructions of module 811 can conditionally issue a request for token activation to a satellite computing node such as node 750, in a first case where the token is in an inactive state at originating computing node 710, and in a second case where the token is missing at originating computing node 710. Upon approval of the request, module 811 can activate the token in the first case, or create the token in an active state in the second case. With the token in the active state, a software process such as 722, 728 can be triggered to perform the update and a transfer counter of the token can be incremented. A request can be transmitted over a network interface to replicate the update at satellite computing node 750. Replication can be optional, and may not be required in all embodiments of the disclosed technologies. Module 811 can also perform a semantic check on the data object in connection with the update. The functions of software module 811 can be distributed as submodules among the token layer 730 and the software processes 722, 728. For example, communication with a partner token layer 740, checking and changing a token state, and invocation of a semantic check can be performed by submodules with the token layer 730, while invocation of token processes can be performed by submodules within a software process 722, 728, and the semantic check can be performed by a callback to another submodule within a software process 722, 728 from the token layer 730.

Module 821 can handle a token activation request from a satellite computing node such as 750. The instructions of module 821 can perform a check using one or more local parameters of the token and one or more parameters of the token from satellite computing node 750. The token parameters of satellite node 750 can be received at computing node 710 within or along with the token activation request. Module 821 can perform a semantic check which can be the same as the semantic check performed by module 811, or a distinct semantic check, and can determine whether to deny or approve the token activation request. A response can be returned to requesting satellite node 750 indicating that the token activation request is approved or denied. The functions of module 821 can also be distributed as submodules among token layer 830 and software processes 722, 728, in a similar fashion as for module 811.

Second Example Token Layer Software

FIG. 9 is a diagram of second example software 940 for providing token services at a satellite computing node such as node 750. Software module 931 includes instructions for causing an external update to the document to be replicated at satellite node 750, under protection of a token framework. The instructions of module 931 can variously check whether prior updates are still pending, perform a semantic check on the data object, or cause a co-resident software process such as 752, 758 to perform the replication on the local copy of the data object. Software module 941 can respond to token activation requests from originating node 710. The instructions of module 941 can check whether the token is locally active, can perform semantic checks, can check if other operations on the data object are pending locally, can deactivate the token locally, or can transmit a response to the requesting node 710. Software module 951 can manage an update to the document originating at the satellite node 750 and can issue a token activation request to node 750 if needed. In examples, this token activation request can be handled by software module 821 of node 710. The functions of software module 931, 941, 951 can be implemented as a plurality of submodules among token layer 740 and software processes 922, 928.

The software modules of FIGS. 8-9 are exemplary, and can be suitable for an embodiment having an asymmetric relationship between computing system 710 having a master copy of shared data and computing system 750 having a slave, satellite, or replicated copy of the shared data. In such an embodiment, all replication requests can originate on computing system 710. In other embodiments, computing systems 710, 750 can have a peer relationship as regards a given data object, with either computing system 710, 750 able to originate an update and issue a corresponding replication request to the other computing system 750, 710. In such embodiments, each computing system 710, 750 can include all the software modules 811, 821, 931, 941, 951 to issue or handle requests with counterpart modules or submodules at the other computing system 740, 730. Other arrangements and distribution of functions can also be implemented, such as described in context of FIG. 10 below.

Second Example System Architecture

Figure 10:
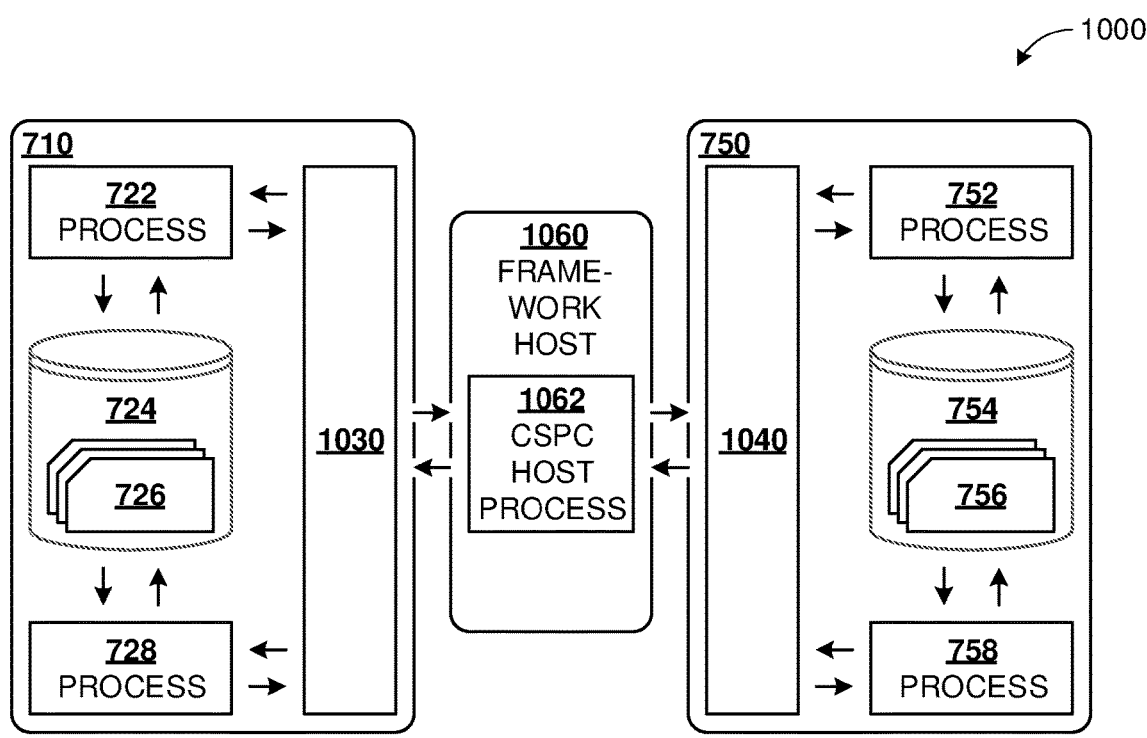
FIG. 10 is a block diagram of a second system architecture implementing another example of the disclosed technologies.

FIG. 10 is a block diagram 1000 of a second system architecture implementing another example of the disclosed technologies. As in FIG. 7, processes 722, 728 on computing system 710 can share some among data objects 726 with processes 752, 758 running on computing system 750 which has its own copies 756 of the shared data objects.

However, the token framework of FIG. 10 includes a framework host computer 1060 running a CSPC host process 1062. That is, requests for token activation or token replication between token management layers 1030, 1040 can be mediated by host process 1062. Particularly, if host process 1062 is aware that computing system 750 has an inactive state for a given token, then host process 1062 can respond directly to a token activation request from token layer 1030, without forwarding the request to token layer 1040, thereby reducing the computational burden on layer 1040. A central host process 1062 can also provide a single point of administration from which configuration, performance monitoring, or other administrative functions can be performed.

Thus, various functions performed by software modules such as 811, 821, 931, 941, 951 can be offloaded to host process 1062. In the embodiment of FIG. 10, token layers 1030, 1040 can be thin clients of the host process 1062.

Example Token Life Cycle

Figure 11:
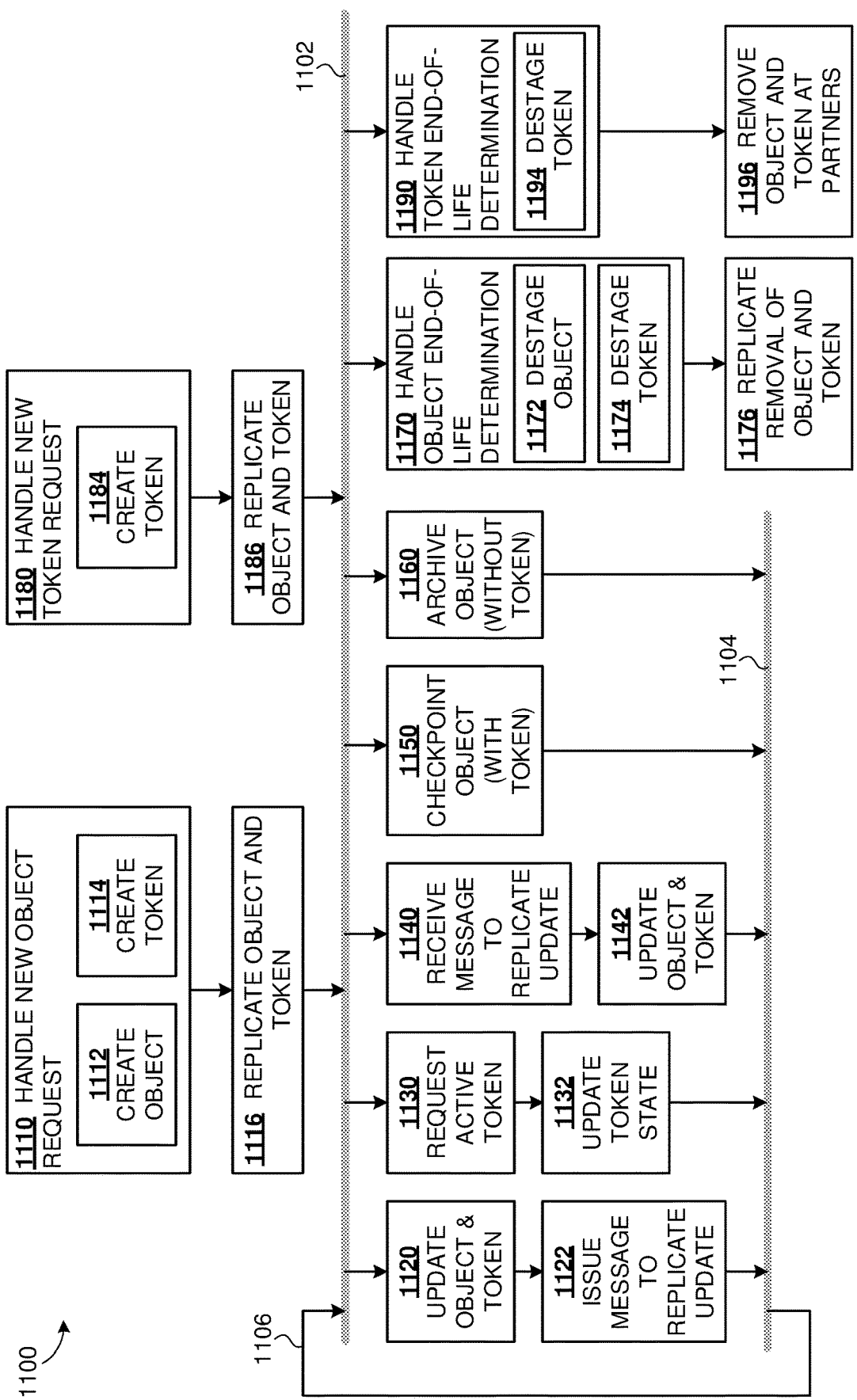
FIG. 11 is a flowchart illustrating a life cycle of a token in an example of the disclosed technology.

FIG. 11 is a flowchart 1100 illustrating an exemplary life cycle of a token. The life cycle of a token can parallel the life cycle of a data object with which it is associated, reflecting the fact that data objects themselves can be instantiated and deleted over the lifetime of a software application or token framework. However, tokens can also be created and destroyed independently from creation or deletion of their associated data objects.

A software application or a client of the software application can request that a new object be created for sharing across multiple computing systems. At process block 1110, such a request can be handled by creating the object at block 1112 and creating the token at block 1114. Process block 1110 can be performed at an originating computing system such as 710. Then, at process block 1116, the new object and token can be replicated to at least one partner computer such as 750.

Once created, numerous operations involving the token can be performed as depicted by various branches from fork point 1102. Subsequent to such operations, the illustrated method can return to join point 1104 and then return via arrow 1106 to fork point 1102 for a next operation involving the token.

On a first branch from fork point 1102, the data object and token can be updated at block 1120, following which a message can be issued at block 1122 to replicate the update at one or more partner computers. On a second branch, any participating computer can request token activation at block 1130, following which the token state can be updated at block 1132 (if the request is approved). On a third branch, a computer can receive a request to replicate an update at block 1140, responsive to which the token and object can be updated at block 1142 (if the replicating computer has or obtains the active state of the token). Along a fourth branch, the data object can be checkpointed at block 1150. In some examples, the checkpointing operation of block 1150 can also save token information to facilitate local restoration of the object and its token state. Along a fifth branch, the data object can be archived at block 1160. In some examples, token information can be omitted from the archiving of block 1160, so that restoration from the archive can include initialization of the token (e.g. with states set to inactive on all computers, or counters all reset to zero). Such operations can repeat in varying order over the lifetime of the data object. The operations shown between fork point 1102 and join point 1104 are exemplary. Some operations (e.g. checkpointing) can be omitted in particular embodiments, and other operations not shown in FIG. 11 (e.g. restoration from an archive or a checkpoint) can also be performed.

Eventually, however, the data object can reach its end-of-life, and the method can proceed to block 1170 to handle an end-of-life determination. Within block 1170, sub-blocks 1172, 1174 can destage the object and destage the token respectively. Destaging can include operations such as removing entries in database tables, freeing associated memory, removing links pointing to the destaged object or token, or garbage collection activities. Finally, at block 1176, the removal of object and token can be replicated to one or more partner computers.

In varying scenarios, blocks 1110, 1170 can be performed at a same computing system or at different computing systems. The operations between fork point 1102 and join point 1104 can be variously performed on any computing systems sharing the data object and token, or on a framework host such as computing system 1060.

Numerous variations and extensions can be implemented. For example, the disclosed technologies can be retrofitted to an operational software environment. In some examples, a software application running on a single computing system can be converted to a distributed configuration over multiple computing systems, or sharing can be required for a data object not previously shared. In such case, block 1180 can handle a request for sharing an existing object, with a token linked to the existing object being created at block 1184. At block 1186, the newly-shared object and its accompanying token can be replicated at one or more partner computing systems.

Conversely, a token can become obsolete before its associated data object reaches end-of-life, for example if a special project ends and sharing of the data object is no longer required. In such case, the method can proceed to block 1190, where token end-of-life can be handled. At sub-block 1194, the token can be destaged. At process block 1196, the token and the associated data object can be removed from one or more partner computing systems, while the object (without token) can remain at an originating computing system.

Additional Example Features

1. Using a Lock System to Protect the Token

A token framework can require protection against race or deadlock conditions e.g. when two computers request the token at the same time. An existing lock system can be used locally on one participating computer to avoid such conflicts. For example, when a request for token activation or a request for replication is to be issued, the token can be protected by a lock (using a conventional lock system) before issuing the request, and the lock can be released after the request is issued, so that no other request can be handled during the period of lock. Because this lock is of short duration and can be managed locally on the request-issuing computer, the burden on the lock system can be minor. For example, when a computer issues a token activation request to a partner computer, the partner computer can locally use one or more locks to protect the local state and local variables of the token, or any local variables that are read for performing a semantic check. Once a decision has been reached on the token activation request, these local locks at the partner computer can be released. Thus, while the token state can be long-lived and persistent, the locks required to manage token handling can be ephemeral, with lifetimes commonly on the order of 0.1-10 ms.

2. Implementing Locks Using Tokens

In another aspect, tokens can be used transparently to implement a lock on a distributed shared data object. That is, a software application can act as if it is within a conventional locking scheme, but the locking and releasing actions can be redirected to the token framework for cross-system data objects. As described herein, the lock and the token can behave differently, so that the software application can perceive the lock to have been released, but the software application cannot proceed with an update if the token is active on a partner computing system.

3. Coarse-Grained Locks and Fine-Grained Tokens

In another aspect, fine-grained tokens can be used to implement coarse-grained locks. In a business example of a software process to pay invoices, it can be more efficient to protect a vendor entity rather than protecting each invoice of that vendor, individually. However, for a token framework, it can be more practical to have a given item (such as an invoice) protected by a single token rather than manage multiple tokens at different levels. A token framework can handle this situation by allowing the software application to lock the vendor (i.e. locking all data objects of the vendor), and translating the single vendor-level lock request from the software application into a large number (e.g. tens, hundreds, or thousands) of token requests at the invoice level. That is, the locking concept implemented by the software application can be independent of the token organization within the token framework.

4. Token Framework Components

A token framework can include main components of a process handler, a token handler, a token request handler, and a token identifier builder. The process handler can provide functions such as IsRelevantForProcess( ) which can determine if a current transaction is relevant for a given process; StartProcess( ) which can create, initialize, and activate a token; RequestActionPermission( ) which can determine whether a token is active locally, or otherwise request token activation; IsActionAllowed( ) which can determine if an action is allowed without requesting the token; TransferProcess( ) which can trigger transfer of a token to a partner computer; or ReceiveProcess( ) which can update token variables at a receiving computer. The token handler can provide basic functions such as create, read, update, or destroy for a token. The token request handler can check if a token activation request was approved or denied. The token identifier builder can provide methods for constructing a token key from various attributes, and for deciphering a token key into constituent attributes. Such an implementation is only exemplary. These or similar functions can be refactored and organized into software components in numerous ways.

A Generalized Computer Environment

Figure 12:
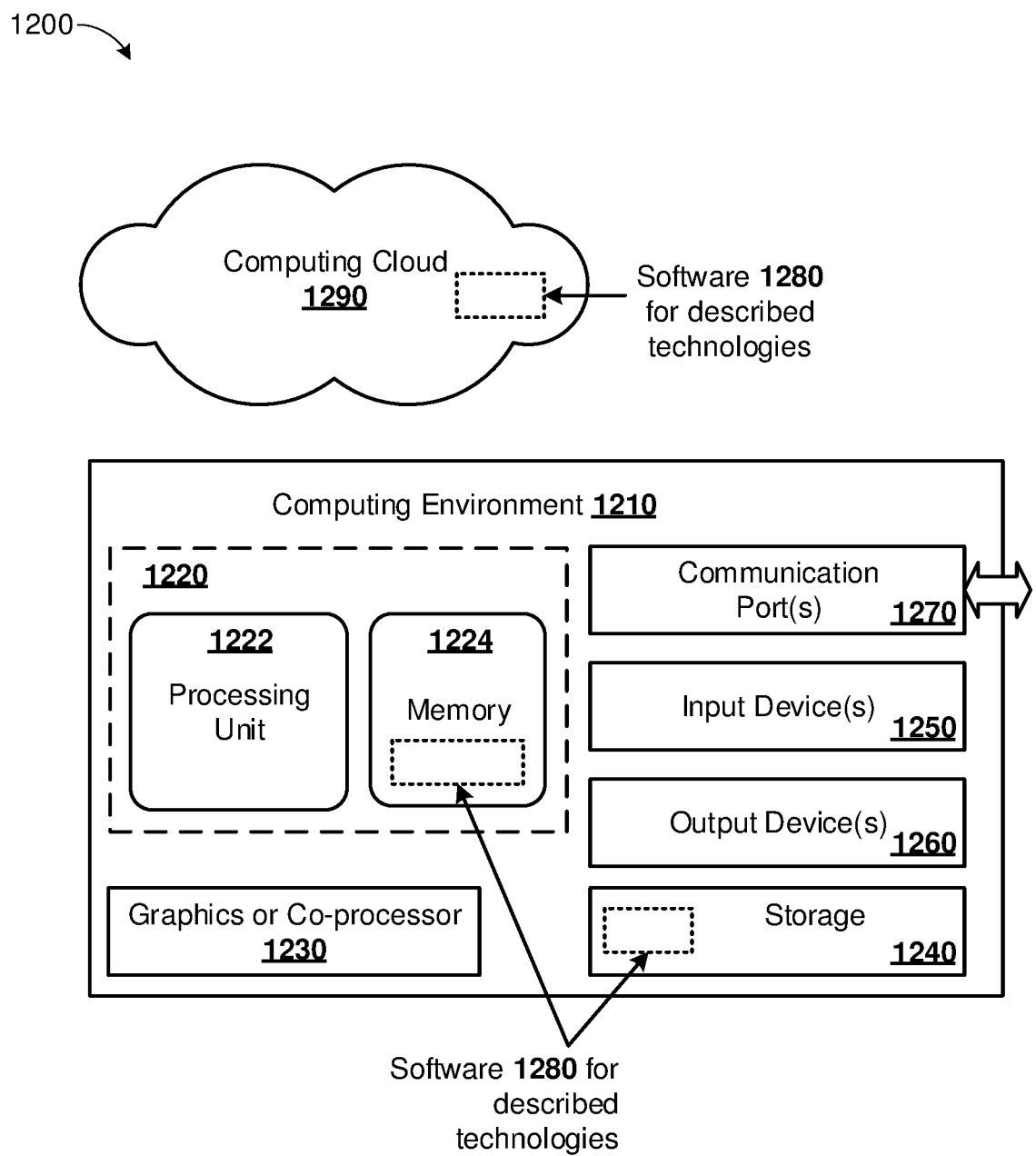
FIG. 12 is a diagram schematically depicting a computing environment suitable for implementation of disclosed technologies.

FIG. 12 illustrates a generalized example of a suitable computing system 1200 in which described examples, techniques, and technologies, including construction, deployment, operation, and maintenance of a framework for controlling updates to data shared between distributed software processes, or software components thereof, can be implemented according to disclosed technologies. The computing system 1200 is not intended to suggest any limitation as to scope of use or functionality of the present disclosure, as the innovations can be implemented in diverse general-purpose or special-purpose computing systems.

With reference to FIG. 12, computing environment 1210 includes one or more processing units 1222 and memory 1224. In FIG. 12, this basic configuration 1220 is included within a dashed line. Processing unit 1222 executes computer-executable instructions, such as for implementing any of the methods or objects described herein for controlling data sharing between distributed software processes, or various other architectures, software components, handlers, managers, modules, or services described herein. Processing unit 1222 can be a general-purpose central processing unit (CPU), a processor in an application-specific integrated circuit (ASIC), or any other type of processor. In a multi-processing system, multiple processing units execute computer-executable instructions to increase processing power. Computing environment 1210 can also include a graphics processing unit or co-processing unit 1230. Tangible memory 1224 can be volatile memory (e.g., registers, cache, or RAM), non-volatile memory (e.g., ROM, EEPROM, or flash memory), or some combination thereof, accessible by processing units 1222, 1230. The memory 1224 stores software 1280 implementing one or more innovations described herein, in the form of computer-executable instructions suitable for execution by the processing unit(s) 1222, 1230. The memory 1224 can also store tokens, queues or other data structures of data object updates, queues or other data structures of requests for token activation, queues or other data structures of requests for replication of updates, message buffers; other configuration data, data structures including data tables, working tables, change logs, output structures, data values, indices, or flags, as well as other operational data.

A computing system 1210 can have additional features, such as one or more of storage 1240, input devices 1250, output devices 1260, or communication ports 1270. An interconnection mechanism (not shown) such as a bus, controller, or network interconnects the hardware components of the computing environment 1210. Typically, operating system software (not shown) provides an operating environment for other software executing in the computing environment 1210, and coordinates activities of the hardware and software components of the computing environment 1210.

The tangible storage 1240 can be removable or non-removable, and includes magnetic disks, magnetic tapes or cassettes, CD-ROMs, DVDs, or any other medium which can be used to store information in a non-transitory way and which can be accessed within the computing environment 1210. The storage 1240 stores instructions of the software 1280 (including instructions and/or data) implementing one or more innovations described herein.

The input device(s) 1250 can be a mechanical, touch-sensing, or proximity-sensing input device such as a keyboard, mouse, pen, touchscreen, trackball, a voice input device, a scanning device, or another device that provides input to the computing environment 1210. The output device(s) 1260 can be a display, printer, speaker, optical disk writer, or another device that provides output from the computing environment 1210.

The communication port(s) 1270 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1200 can also include a computing cloud 1290 in which instructions implementing all or a portion of the disclosed technologies are executed. Any combination of memory 1224, storage 1240, and computing cloud 1290 can be used to store software instructions or data of the disclosed technologies.

The present innovations can be described in the general context of computer-executable instructions, such as those included in program modules, being executed in a computing system on a target real or virtual processor. Generally, program modules or software components include routines, programs, libraries, layers, frameworks, software objects, classes, data structures, etc. that perform tasks or implement particular abstract data types. The functionality of the program modules can be combined or split between program modules as desired in various embodiments. Computer-executable instructions for program modules can be executed within a local or distributed computing system.

The terms "computer," "computing system," "computing environment," "computing node," and "computing device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 13:
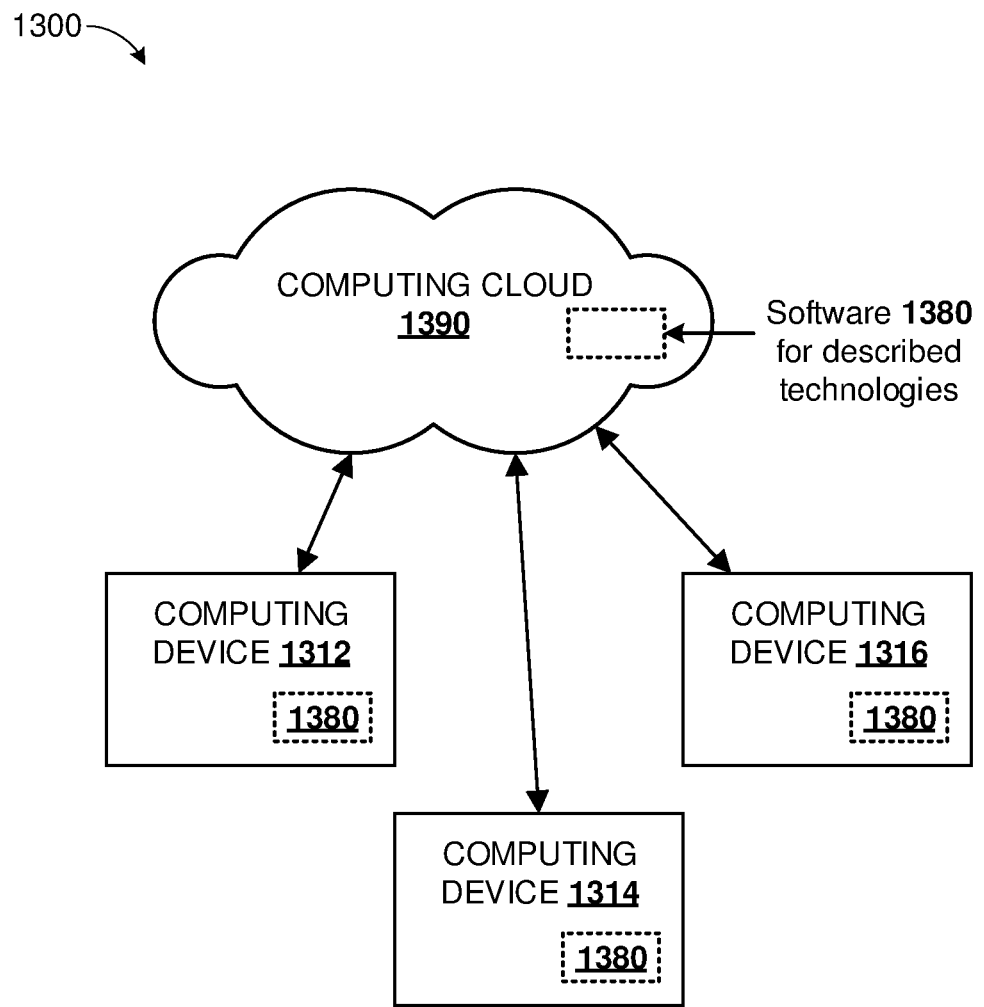
FIG. 13 is a diagram schematically depicting computing devices operating in conjunction with a computing cloud for implementation of disclosed technologies.

FIG. 13 depicts an example cloud computing environment 1300 in which the described technologies can be implemented. The cloud computing environment 1300 comprises a computing cloud 1390 containing resources and providing services. The computing cloud 1390 can comprise various types of cloud computing resources, such as computer servers, data storage repositories, networking resources, and so forth. The computing cloud 1390 can be centrally located (e.g., provided by a data center of a business or organization) or distributed (e.g., provided by various computing resources located at different locations, such as different data centers and/or located in different cities or countries).

The computing cloud 1390 can be operatively connected to various types of computing devices (e.g., client computing devices), such as computing devices 1312, 1314, and 1316, and can provide a range of computing services thereto. One or more of computing devices 1312, 1314, and 1316 can be computers (e.g., servers, virtual machines, embedded systems, desktop, or laptop computers), mobile devices (e.g., tablet computers, smartphones, or wearable appliances), or other types of computing devices. Communication links between computing cloud 1390 and computing devices 1312, 1314, and 1316 can be over wired, wireless, or optical links, or any combination thereof, and can be short-lived or long-lasting.

Communication links can be continuous or sporadic. These communication links can be stationary or can move over time, being implemented over varying paths and having varying attachment points at each end. Computing devices 1312, 1314, and 1316 can also be connected to each other.

Computing devices 1312, 1314, and 1316 can utilize the computing cloud 1390 to obtain computing services and perform computing operations (e.g., data processing, data storage, and the like). Particularly, software 1380 for performing the described innovative technologies can be resident or executed in the computing cloud 1390, in computing devices 1312, 1314, or 1316, or in a distributed combination of cloud 1390 and computing devices 1312, 1314, or 1316.

GENERAL CONSIDERATIONS

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "abort," "accept," "access," "act," "activate," "add," "allow," "apply," "approve," "archive," "authorize," "block," "call," "check," "checkpoint," "commit," "configure," "control," "convey," "create," "decide," "delete," "deny," "designate," "destage," "destroy," "detect," "determine," "direct," "display," "establish," "evaluate," "execute," "fan," "fork," "forward," "free," "generate," "handle," "incorporate," "increment," "indicate," "initialize," "input," "issue," "join," "link," "launch," "lock," "loop," "mediate," "modify," "notify," "obtain," "output," "perform," "prohibit," "process," "protect," "provide," "queue," "receive," "refuse," "reject," "release," "remove," "replicate," "request," "reset," "respond," "retain," "return," "select," "send," "set," "share," "store," "terminate," "transact," "transfer," "translate," "transmit," "trigger," "update," "use," "verify," or "wait," to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1224, and storage 1240. The term computer-readable storage media does not include signals and carrier waves. In addition, the term computer-readable storage media does not include communication ports (e.g., 1270) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technologies are not limited to any specific computer language or program. For instance, the disclosed technologies can be implemented by software written in ABAP, Adobe Flash, Angular, C, C++, C #, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technologies are not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer-implemented method of updating a data object, the method comprising:
at a first computing system:
determining that a token for the data object is in an inactive state, wherein the token is distinct from the data object and controls access to the data object; and
issuing a request for the token to be activated for the first computing system;
at a second computing system having the token in an active state:
responsive to the request, verifying that a semantic check on the data object is satisfied, and
releasing the token to the first computing system; and
at the first computing system:
responsive to the releasing, updating the data object.

2. The computer-implemented method of claim 1, further comprising:
transmitting a message from the first computing system to the second computing system to replicate the updating at the second computing system.

3. The computer-implemented method of claim 2, further comprising:
making a determination that the active state token can be released, after the updating, from the first computing system; and
designating, responsive to the determination and in the message, the token as active at the second computing system.

4. The computer-implemented method of claim 1, wherein the semantic check determines whether a state of the data object at the second computing system is consistent with the updating of the data object.

5. The computer-implemented method of claim 1, further comprising:
protecting the token with a lock locally at the first computing system for the determining action;
protecting the data object with a lock locally at the first computing system for the updating action; and
protecting one or more objects required for the semantic check with respective lock(s) at the second computer system for the verifying action.

6. The computer-implemented method of claim 5, wherein the one or more objects comprise a copy of the data object stored at the second computing system and at least one additional data object.

7. The computer-implemented method of claim 1, wherein the request is a first request and the updating is a first updating for a first transaction on the data object, and the method further comprises, for a second transaction comprising a second update to the data object:
at the first computing system having the token in the inactive state:
issuing a second request for the token to be activated for the first computing system;

at the second computing system having the token in the inactive state and having no pending updates associated with the token:
responding to the second request; and
at the first computing system, responsive to the responding:
activating the token at the first computing system; and
performing the second update to the data object.

8. The computer-implemented method of claim 1, wherein the request is a first request and the updating is a first updating for a first transaction on the data object, and the method further comprises, for a second transaction comprising a second update to the data object:
at the second computing system having the token in the inactive state:
issuing a second request for the token to be activated for the second computing system; and
at the first computing system:
establishing that a prior replication request on the data object is pending; and
transmitting a message from the first computing system to the second computing system to deny the second request.

9. The computer-implemented method of claim 8, wherein the establishing and the transmitting are performed with the token in the inactive state at the first computing system.

10. The computer-implemented method of claim 8, wherein the establishing is based on a comparison of a first transfer counter for the token at the first computing system and a second transfer counter for the token at the second computing system, wherein the second transfer counter is included with the second request.

11. The computer-implemented method of claim 1, wherein the request is a first request and the updating is a first updating for a first transaction on the data object, and the method further comprises, for a second transaction comprising a second update to the data object:
at the first computing system, having the token in the active state:
aborting the second update; and
releasing the token, to leave the token in an inactive state at both the first and second computing systems, such that both the first and second computing systems are enabled to subsequently issue a second request for activation of the token.

12. The computer-implemented method of claim 1, wherein the request is a first request and the updating is a first updating for a first transaction on the data object, and the method further comprises, for a second transaction comprising a second update to the data object:
at the first computing system having the token in the inactive state:
issuing a second request for the token to be activated for the first computing system; and
at the second computing system having the token in the active state:
establishing that the semantic check for the data object is not satisfied; and
responsive to the establishing, transmitting a message denying the second request.

13. One or more non-transitory computer-readable media storing instructions which, when executed by one or more hardware processors, cause the one or more hardware processors to perform one or more operations comprising:
responsive to update of an object at a first computing node, transmitting, from the first computing node to a second computing node, a message requesting replication of the update, wherein the message requesting replication further designates a state of a token associated with the object, wherein the token is distinct from the data object and the state of the token controls access to the data object, and wherein:
in a first case, the message requesting replication further designates the token as active at the second computing node; and
in a second case, the message requesting replication further designates the token as inactive at the second computing node.

14. The one or more non-transitory computer-readable media of claim 13, wherein the update is a second update following an earlier first update to the object, and the operations further comprise:
detecting, at the second computing node, that the first update on the object is pending; and
waiting until the first update has been completed and then performing the replication of the second update.

15. The one or more non-transitory computer-readable media of claim 13, wherein the update is a first update, the message is a first message that designates the token as inactive at the second computing node, and the operations further comprise:
responsive to a second update of the object at the first computing node, following the first update, transmitting a second message to the second computing node for replication of the second update, wherein the second message designates the token as active at the second computing node.

16. The one or more non-transitory computer-readable media of claim 13, wherein the operations further comprise:
selecting between the first case and the second case based upon an indication whether a next update on the object is more likely to be at the first computing node or at the second computing node.

17. The one or more non-transitory computer-readable media of claim 13, wherein the first and second computing nodes maintain respective first and second token transfer counts for the token, and the operations further comprise:
incrementing the first token transfer count upon completion of the update at the first computing node;
incorporating the first token transfer count in the message; and
updating the second token transfer count upon receipt of the message at the second computing node, along with performing the replication of the update.

18. A system comprising:
one or more hardware processors, with memory coupled thereto;
a network interface coupling the one or more hardware processors to a satellite computing node; and
computer-readable storage media storing instructions executable by the one or more hardware processors and comprising:
first instructions which, when executed, manage an update to a document protected by a token in a token framework by:
checking a first token state of the token for an originating computing node;
in a first case having the first token state being inactive, issuing a first request to activate the token and, upon approval of the first request, activating the token;
in a second case having the first token state being missing, issuing a second request to activate the token and, upon approval of the second request, creating the token in an active state;

causing the update to the document to be performed at the originating computing node;

incrementing a transfer counter of the token to reflect the update;

performing a first semantic check; and transmitting, over the network interface, a third request to replicate the update at the satellite computing node, the third request incorporating the incremented transfer counter; and second instructions which, when executed, handle a fourth request, for token activation, by:

performing a check using one or more parameters of the token for the originating computing node and one or more parameters of the token for the satellite computing node;

performing a second semantic check;

determining whether to deny or approve the fourth request;

in a third case, deactivating the token for the originating computing node and transmitting a response to the fourth request, over the network interface, indicating that the fourth request is approved; and in a fourth case, transmitting a response to the fourth request, over the network interface, indicating that the fourth request is denied.

19. The system of claim 18, wherein the one or more hardware processors are part of the originating computing node, the update is a first update, and the system further comprises:

at least one additional hardware processor of the satellite computing node, with additional memory coupled thereto and an additional network interface coupled to the originating computing node; and additional computer-readable storage media storing additional instructions executable by the at least one additional hardware processor and comprising:

third instructions which, when executed, cause the first update to be replicated at the satellite computing node responsive to the third request and contingent on a test of the transfer counter;

fourth instructions which, when executed, handle the first or second request; and fifth instructions which, when executed, manage a second update to the document including, in at least a fifth case, issuing the fourth request.

20. The system of claim 19, wherein:

the computer-readable storage media at the originating computing node stores copies of the third instructions, fourth instructions, and fifth instructions; and the additional computer-readable storage media at the satellite computing node stores copies of the first instructions and second instructions.

\* \* \* \* \*